(12) United States Patent
Akama

(10) Patent No.: US 7,275,158 B2
(45) Date of Patent: Sep. 25, 2007

(54) HOME SERVER INCLUDING A PROXY FACILITY, FOR EXECUTING AN AUTHENTICATION AND AN ENCRYPTION PROCESS INSTEAD OF A USER TERMINAL, IN AN ELECTRONIC COMMERCIAL TRANSACTION

(75) Inventor: Katsuaki Akama, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 562 days.

(21) Appl. No.: 09/829,674

(22) Filed: Apr. 10, 2001

(65) Prior Publication Data

US 2002/0062440 A1  May 23, 2002

(30) Foreign Application Priority Data

Nov. 21, 2000  (JP)  ............................. 2000-353895

(51) Int. Cl.
   H04L 9/32  (2006.01)
(52) U.S. Cl. ..................... 713/171; 726/9; 380/278
(58) Field of Classification Search ................ 713/201, 713/200, 176, 175, 155, 185, 171; 705/67, 705/70, 64; 726/9; 380/278

See application file for complete search history.

(56) References Cited

U.S. PATENT DOCUMENTS

| | | | |
|---|---|---|---|
| 5,586,260 A | 12/1996 | Wei-Ming | |
| 6,039,248 A | 3/2000 | Park et al. | |
| 6,134,661 A * | 10/2000 | Topp | ........................ 726/18 |
| 6,233,577 B1 | 5/2001 | Ramasubramani et al. | |
| 6,351,813 B1 * | 2/2002 | Mooney et al. | ............. 713/185 |
| 6,373,950 B1 * | 4/2002 | Rowney | ..................... 380/255 |
| 6,718,274 B2 * | 4/2004 | Huang et al. | ................. 702/64 |
| 6,732,269 B1 * | 5/2004 | Baskey et al. | .............. 713/153 |

FOREIGN PATENT DOCUMENTS

| | | |
|---|---|---|
| EP | 0 942 568 | 9/1999 |
| JP | 2000101753 | 4/2000 |

(Continued)

OTHER PUBLICATIONS

Menezes et al, Handbook of Applied Cryptography, 1997, pp. 15, 31.*

(Continued)

Primary Examiner—Emmanuel L. Moise
Assistant Examiner—Michael Pyzocha
(74) Attorney, Agent, or Firm—Katten Muchin Rosenman LLP

(57) ABSTRACT

A home server includes a proxy facility and is provided between a user terminal and an electronic market server for executing authentication and encryption to the electronic market server, instead of the user terminal, in an electronic commercial transaction. The proxy facility includes: an establishing unit for establishing an encrypted communication session between the user terminal and the home server, using public/secret keys of the user terminal and an electronic signature both transmitted from the user terminal; a proxy unit for executing authentication of a certificate and exchanging a common key between the home server and the electronic market server, using public/secret keys of the electronic market server; and an information unit for informing the common key to the user terminal through the encrypted communication session; wherein an encrypted communication is executed between the user terminal and the electronic market server by using the common key that was exchanged between the home server and the electronic market server.

8 Claims, 28 Drawing Sheets

FOREIGN PATENT DOCUMENTS

WO     WO97/15885     5/1997
WO     99/57835     11/1999

OTHER PUBLICATIONS

Hughes, "Certificate Inter-Operability White Paper" Computer & Sercurity, International Journal Devoted To The Study of Technical and Financial Aspects of Computer Security Elsevier Science Publishers: vol. 18, No. 3, 1999; pp. 221-230 XP004164023; ISSN:0167-4048.

European Office action dated Dec. 27, 2005.

Hughes, "Certificate Inter-Operability White Paper" Computer & Sercurity, International Journal Devoted To The Study of Technical and Financial Aspects of Computer Security Elsevier Science Publishers: vol. 18, No. 3, 1999; pp. 221-230 XP004164023; ISSN:0167-4048.

European Search Report dated Jul. 3, 2003, for European Patent Application EP 01 10 9334.

European Office action dated Jan. 28, 2005.

* cited by examiner

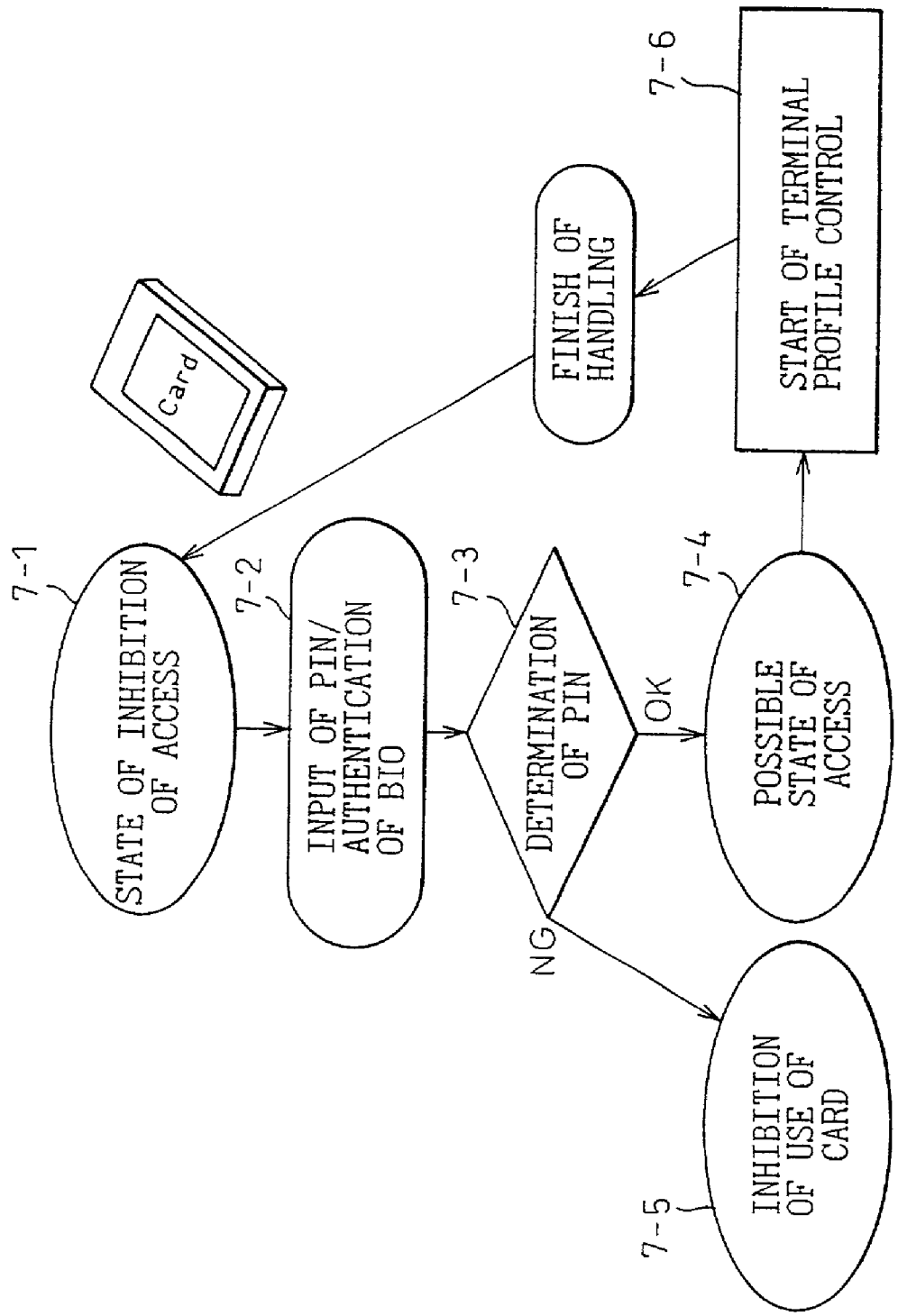

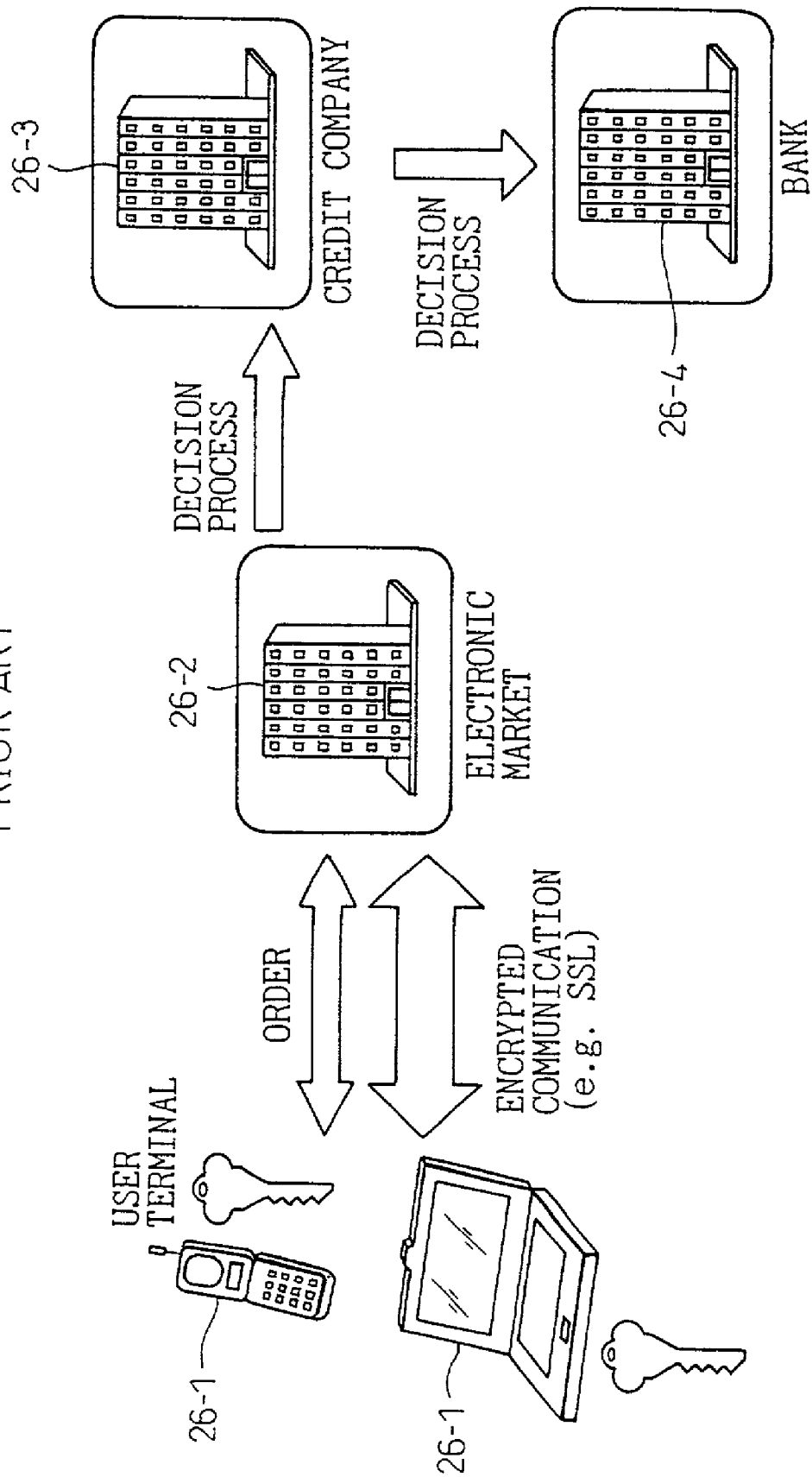

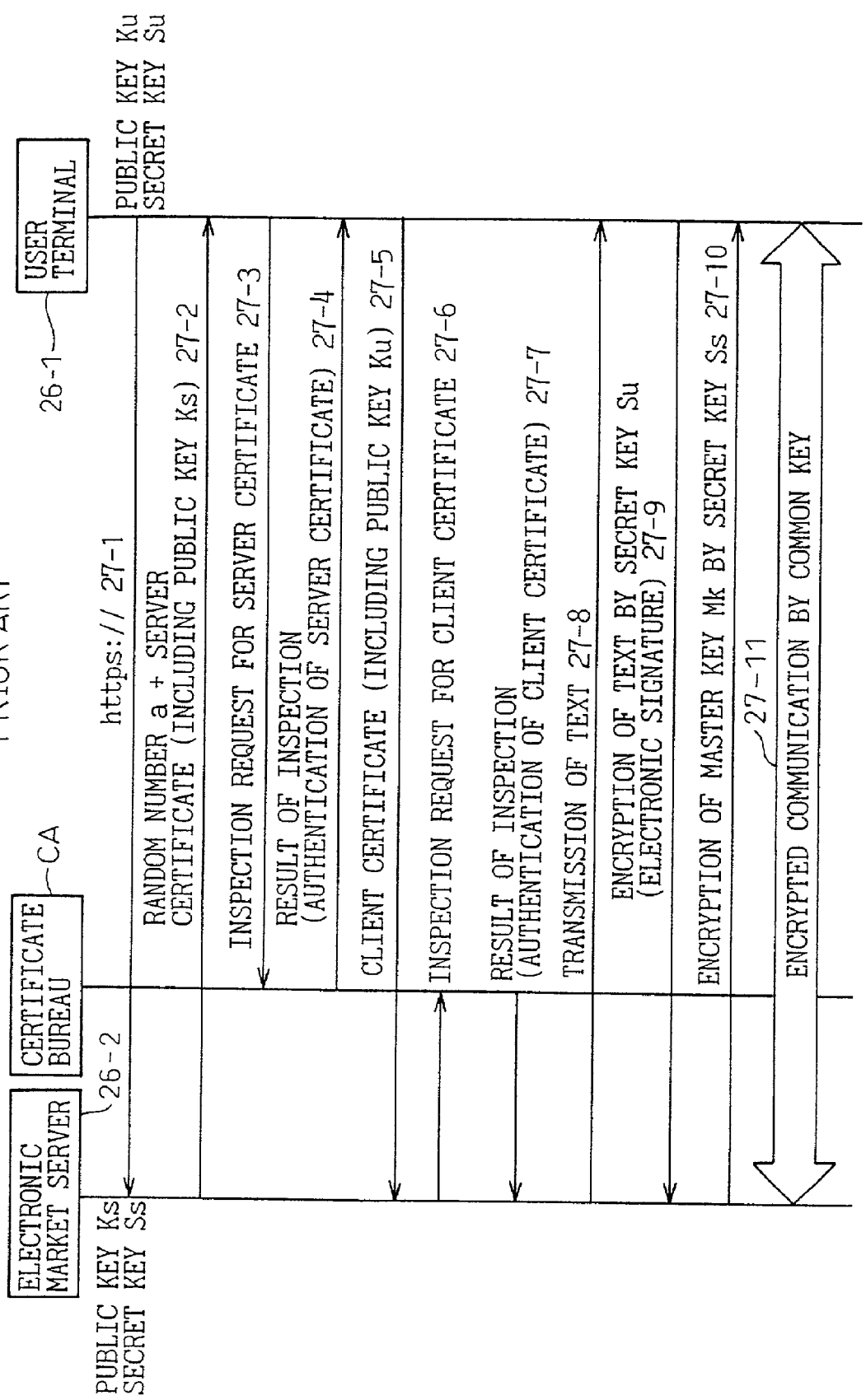

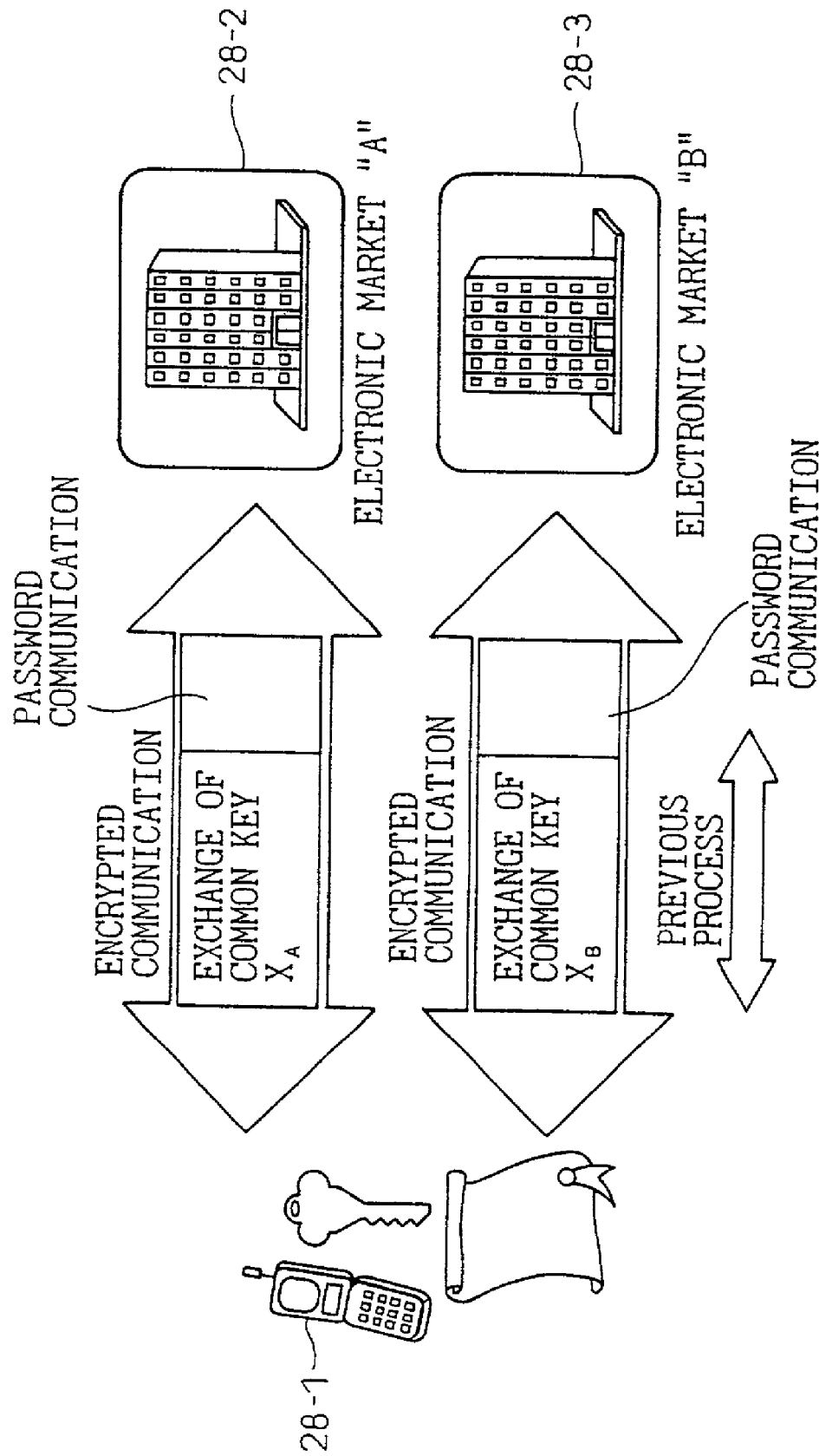

HOME SERVER INCLUDING A PROXY FACILITY, FOR EXECUTING AN AUTHENTICATION AND AN ENCRYPTION PROCESS INSTEAD OF A USER TERMINAL, IN AN ELECTRONIC COMMERCIAL TRANSACTION

BACKGROUND OF INVENTION

1. Field of Invention

The present invention relates to a home server including a proxy facility, provided between a user terminal and an electronic market server, for executing an authentication and encryption process with the electronic market server, instead of the user terminal, in an electronic commercial transaction (indicated below as electronic commerce), and relates to an access card and home card used for permitting access to the proxy facility and the electronic market server in electronic commerce.

2. Description of the Related Art

In the distribution of information including personal or secret information, in electronic commerce, it is important to ensure the security of information in order to transmit it in safety and to and from a destination without it being stolen and used or revised by a third party. Accordingly, a high reliability is required for various processing steps in electronic commerce in order to ensure the security of the information. Also, simplified handling steps and very short processing time for ensuring the security are always required for a user terminal utilized by a user who utilizes electronic commerce.

SUMMARY OF THE INVENTION

The object of the present invention is to provide a home server including a proxy facility provided between a user terminal and an electronic market server for executing an authentication and encryption to the electronic market server, instead of the user terminal, in electronic commerce, so that it is possible to realize reduction of processing time for executing an encrypted communication including exchange of a common key, reduction of stand-by time at a user, reduction of communication charges, high security for personal and secret information, and the like, in electronic commerce.

In accordance with the present invention, there is provided a home server including a proxy facility provided between a user terminal and an electronic market server for executing an authentication and encryption to the electronic market server, instead of the user terminal, in an electronic commercial transaction, including:

an establishing unit for establishing an encrypted communication session between the user terminal and the home server, using public/secret keys of the user terminal and an electronic signature both transmitted from the user terminal;

a proxy unit for executing authentication of a certificate and exchanging a common key between the home server and the electronic market server, using public/secret keys of the electronic market server; and an information unit for informing the common key to the user terminal through the encrypted communication session;

wherein an encrypted communication is executed between the user terminal and the electronic market server by using the common key that was exchanged between the home server and the electronic market server.

In a preferred embodiment, the home server having the proxy facility further includes a home card including an encryption managing section for executing the electronic signature and authentication of the certificate in order to execute authentication and exchange of the common key to the electronic market server.

In another preferred embodiment, the home card includes a logic circuit which enables an access by using a first password input from the user terminal; and a security releasing section releases the security for the proxy section by using a second password input from the user terminal, after establishment of the encrypted communication session to the user terminal in which an access was permitted, In still another preferred embodiment, the home card includes an information section for recording decision information regarding electronic money in the home card and for informing the recorded decision information to a mail address of the user terminal.

In still another preferred embodiment, the home card includes a cancel section for canceling the decision information in the home card based on an authentication information for canceling the decision, and for adding electronic money subtracted by the decision to the electronic money in the home card.

In still another embodiment, the home card includes a re-supplement means for supplementing the electronic money by adding supplementary electronic money, which was requested by the user terminal, to the electronic money in the home card, based on the authentication information in an electronic money managing facility provided in the proxy facility.

In still another preferred embodiment, the access card is used in an electronic commercial transaction constituted by a user terminal, a home server and an electronic market server; the access card is connected to the user terminal; and the home server includes the proxy facility provided between the user terminal and the electronic market server for executing authentication and encryption to the electronic market server, instead of the user terminal. Further, the access card includes:

an establishment section for establishing an encrypted communication session between the user terminal and the home server including the proxy facility; and an encrypted communication section for receiving a common key, which is exchanged between the home server and the electronic market server after an authentication process for the electronic market server, from the home server through the encrypted communication session, and for executing the encrypted communication with the electronic market server by using the common key.

BRIEF DESCRIPTION OF THE DRAWINGS

FIG. 7 shows access control steps provided by using the access card according to the present invention;

FIG. 26 shows a security managing technique in conventional electronic commerce;

FIG. 27 shows communication steps in the conventional security management shown in FIG. 26; and FIG. 28 shows one example of the electronic transaction with a plurality of electronic markets.

DESCRIPTION OF THE PREFERRED EMBODIMENTS

Before describing the preferred embodiments of the present invention, a background art and its problems will be explained in detail with reference to drawings.

Figure 25:
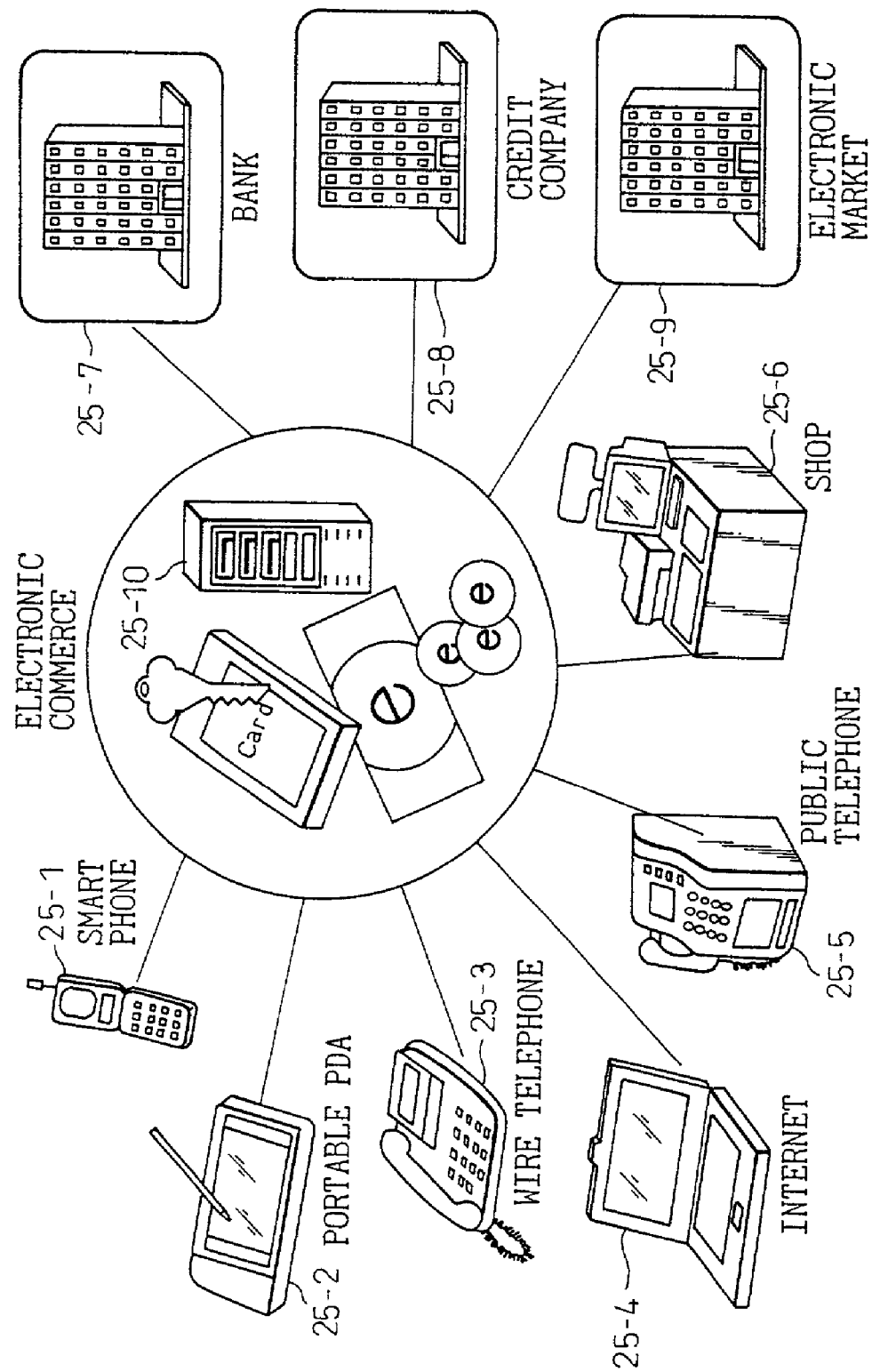
FIG. 25 shows various examples of a user terminal and information processing equipment used in electronic commerce.

FIG. 25 shows various examples of a user terminal and information processing equipment used in electronic commerce. As shown in the drawings, various kinds of user terminal are utilized in electronic commerce.

In the drawing, 25-1 is a wireless hand-held phone including a function of data communication and software for managing personal information (PIM: Personal Information Manager); 25-2 is a portable information terminal (PDA: Personal Digital Assistants); 25-3 is a wired multi-function telephone terminal; 25-4 is a personal computer connected to an internet; 25-5 is a public telephone set useable with an IC card, etc.; 25-6 is a desk-top type data processing equipment used in a shop or office; 25-7 is a server used in a bank; 25-8 is a server used in a credit company; 25-9 is an electronic server used in an electronic market; and 25-10 is a server for electronic commerce.

The user utilizes any one of terminals 25-1 to 25-6 each of which is connected to the electronic market server 25-9 through the server 25-10 for the electronic commerce. In this case, the electronic commerce between the user terminal and the electronic market server 25-9 is executed by using various security techniques on data communication, such as an encryption technique, a technique of an electronic signature and an authentication technique.

FIG. 26 shows a security managing technique in conventional electronic commerce. In the drawing, 26-1 is the user terminal, 26-2 is the electronic market server, 26-3 is the credit company, and 26-4 is the bank. In the conventional security management, the encrypted communication for authentication and reception of an order is executed between the user terminal 26-1 and the electronic market server 26-2 through a session based on protocols having security function, for example, "https" (hypertext transfer protocol over transport layer security/secure sockets layer), etc. The electronic market server 26-2 executes decision processes at the electronic commerce for the server 26-3 used in the credit company, and the server 26-3 executes decision processes for the server 26-4 used in the bank.

FIG. 27 shows communication steps in the conventional security management shown in FIG. 26. First, the user terminal 26-1 transmits a session request to ensure the security based on an https-protocol to the electronic market server 26-2 (step 27-1). In this case, it is assumed that the user terminal 26-1 holds a public key Ku of its own terminal and a secret key Su which makes a pair with the public key Ku, and the electronic market server 26-2 holds a public key Ks of its own server and a secret key Ss which makes a pair with the public key Ks.

When the electronic market server 26-2 receives the session request (https://) to ensure the security, it transmits a random number "a" and a server certificate, which authenticates that the server 26-2 is an authorized and true server (step 27-2). The server certificate has a length of about two kilobytes including the public key Ks of the electronic market server 26-2 and information of a certificate authority CA that issued the server's certificate.

When the user terminal 26-1 receives the server's certificate, it transmits an inspection request to the certificate authority CA in order to confirm whether or not the server certificate is true (step 27-3). The certification authority CA inspects the server's certificate in accordance with the inspection request. If the server's certificate is true, the certification authority CA transmits an authentication indicating the true certificate to the user terminal 26-1 (step 27-4).

When the user terminal 26-1 obtains the authentication from the electronic market server 26-2, the user terminal 26-1 transmits a client's certificate to the electronic market server 26-2 (step 27-5). The client's certificate has a length of two kilobytes including the public key Ku of the user terminal 26-1 and information of the certificate authority CA that issued the client's certificate.

When the electronic market server 26-2 receives the client's certificate, it transmits the inspection request to the certificate authority CA in order to confirm whether the client's certificate is true or not (step 27-6). The certificate authority CA inspects the client's certificate in accordance with the inspection request. If the client's certificate is true, the certificate authority CA transmits the authentication indicating the true certificate to the electronic market server 26-2 (step 27-7).

When the electronic market server 26-2 obtains the authentication of the user terminal 26-1, the server 26-2 transmits information of a text that is not encrypted to the user terminal 26-1 (step 27-8). The user terminal 26-1 encrypts the text by using the secret key Su of its own terminal, and returns an encrypted text with an electronic signature to the electronic market server 26-2 (step 27-9).

The electronic market server 26-2 decrypts the encrypted text, which is transmitted thereto with the secret key Su of the user terminal 26-1, by using the public key Ku of the user terminal 26-1 which is previously transmitted from the user terminal 26-1. Further, the electronic market server 26-2 verifies a decrypted text with the text information, which is transmitted from the server 26-2 to the user terminal 26-1 in step 27-8, and confirms the electronic signature of the user terminal 26-1. The above steps of the electronic-signature function using the public key and the secret key are known as a public key encryption system.

When the electronic market server 26-2 confirms the electronic-signature function of the user terminal 26-1, the electronic market server 26-2 transmits information of a master key Mk, which is used as a common key and encrypted by the secret key Ss of the electronic market server 26-2, to the user terminal 26-1 (step 27-10).

The user terminal 26-1 decrypts the text encrypted by the master key Mk by using the public key Ks of the electronic market server 26-2, and generates the common key X by combining the decrypted master key Mk with the random number "a".

After above steps, the common key X, which is commonly used between the user terminal 26-1 and the electronic market server 26-2, is determined. The transmission and reception of the personal/secret information, which are needed to execute the electronic commerce, can be executed using the common key X (step 27-11).

FIG. 28 shows one example of the electronic commerce with a plurality of electronic markets. When the electronic market server is different from the first electronic market server, it is necessary to independently execute the electronic commerce with another electronic market server. For example, it is assumed that, first, a user executes the electronic commerce with the electronic market A (28-2) by using the user terminal 28-1, and the user executes another transaction with the electronic market B (28-3) after the above transaction. In this case, the encrypted communication for the electronic commerce is executed by using the public key, the secret key and the certificate between the user terminal 28-1 and the electronic market server A (28-2) in order to exchange the common key Xa in accordance with the steps shown in FIG. 27. Further, another encrypted communication for another electronic commerce is also executed based on the same as above between the user terminal 28-1 and the electronic market server B (28-3) in order to exchange the common key Xb in accordance with the same steps as above.

There are, however, many problems, i.e., much time is required for processing encryption and decryption using public and secret keys, much data exchange is required for authentication of a certificate, and high charges are required for encrypted communication, security in the electronic commerce and the like, in the above-explained conventional art.

Accordingly, as explained in detail below, the present invention aims to provide a home server including a proxy facility provided between a user terminal and an electronic market server for executing authentication and encryption to the electronic market server, instead of the user terminal, in electronic commerce, so that it is possible to realize reduction of processing time for executing an encrypted communication including exchange of common key, reduction of stand-by time for a user, reduction of communication charges, high security for personal and secret information, and the like, in electronic commerce.

The preferable embodiments according to the present invention will be explained in detail with reference to the attached drawings below.

Figure 1:
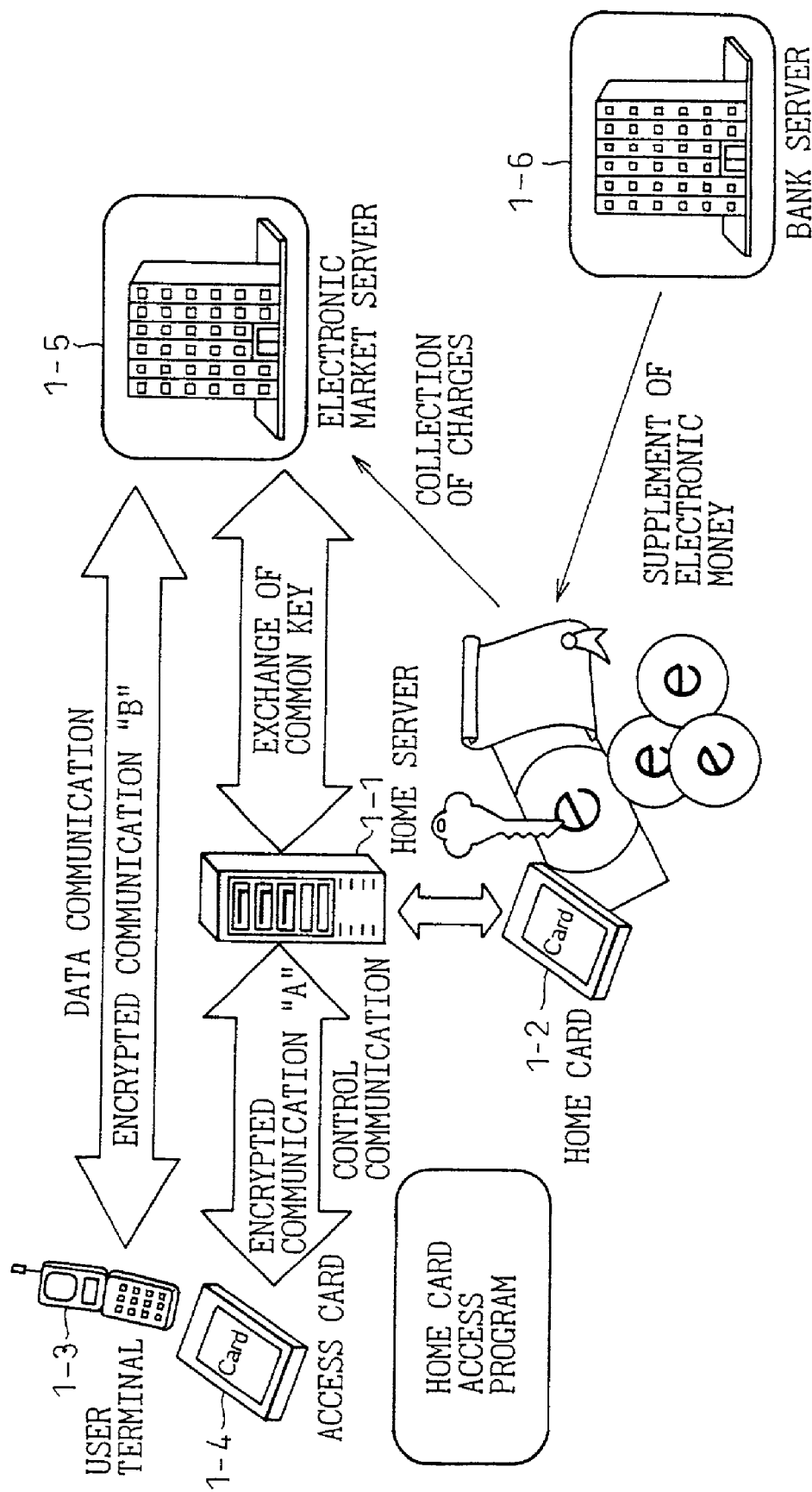
FIG. 1 shows a proxy processing system for executing an authentication and encryption, instead of a user terminal, in electronic commerce according to the present invention.

FIG. 1 shows a proxy processing system of an authentication and encryption in electronic commerce. A proxy facility provided in a home server executes authentication and encryption processes of an order and a decision, etc., instead of an operation at a user terminal, in electronic commerce.

In FIG. 1, 1-1 is a home server including the proxy facility and is used for executing electronic commerce, 1-2 is a home card used by a user, 1-3 is a user terminal, 1-4 is an access card used for accessing the home card, 1-5 is an electronic market server, and 1-6 is a server for a bank.

The home server 1-1 should be provided in a safe place, for example, in a user's home, and can manage in safety the secret information for electronic commerce. Further, the home server 1-1 should be placed at a location where it can be connected to an Internet and can be accessed by the user terminal. Further, it is possible to utilize another server formed of a home network, which is connected to other electronic equipments and security equipments in the home. Still further, the home server 1-1 may be placed in a particular facility, which can manage secret information in safety and with high reliability.

The home card 1-2 is used for executing the electronic commerce and it is formed of an IC card including an authorized certificate, a published algorithm regarding each electronic market, etc. Further, the home card 1-2 includes a logic circuit formed of hardware for determining a password, which can be rewritten by the user. When the password is input, it is possible to start the access of the electronic commerce. The home card 1-2 is always connected to the home server 1-1 through the home network in which the security is ensured.

The access card 1-4 is used for accessing from the user terminal 1-3 to the home card 1-2, and a program for accessing the home card 1-2 is stored in the access card 1-4. Accordingly, it is possible to establish the encryption communication between the user terminal 1-3 and the home card 1-2 based on the access program stored in the access card 1-4.

The home card 1-2 is protected by the security function formed by the encryption (password) of the user using the logic circuit. Accordingly, after establishment of the electronic commerce for the user terminal 1-3 in which the access is permitted by inputting the encryption, it is possible to execute the electronic commerce in use of the home card 1-2 by inputting the encryption in order to release the security function which is installed in the home card 1-2, from the user terminal 1-3.

When the user executes the encrypted communication with the electronic market server 1-5 from the user terminal 1-3, the home server 1-1 executes the authentication process, the exchange process of the common key, etc., instead of the user terminal 1-3, between the home server 1-1 and the electronic market server 1-5 using the security information included in the home card 1-2.

When the exchange of the common key is completed between the home server 1-1 and the electronic market server 1-5, the home server 1-1 informs the common key to the user terminal 1-3 through the control communication line (an encrypted communication A). The user terminal 1-3 executes the encrypted data communication with the electronic market server 1-5 using the common key (an encrypted communication B). As a result, the user terminal 1-3 can execute the data communication including the personal information or secret information with the electronic market server 1-5.

Figure 2:
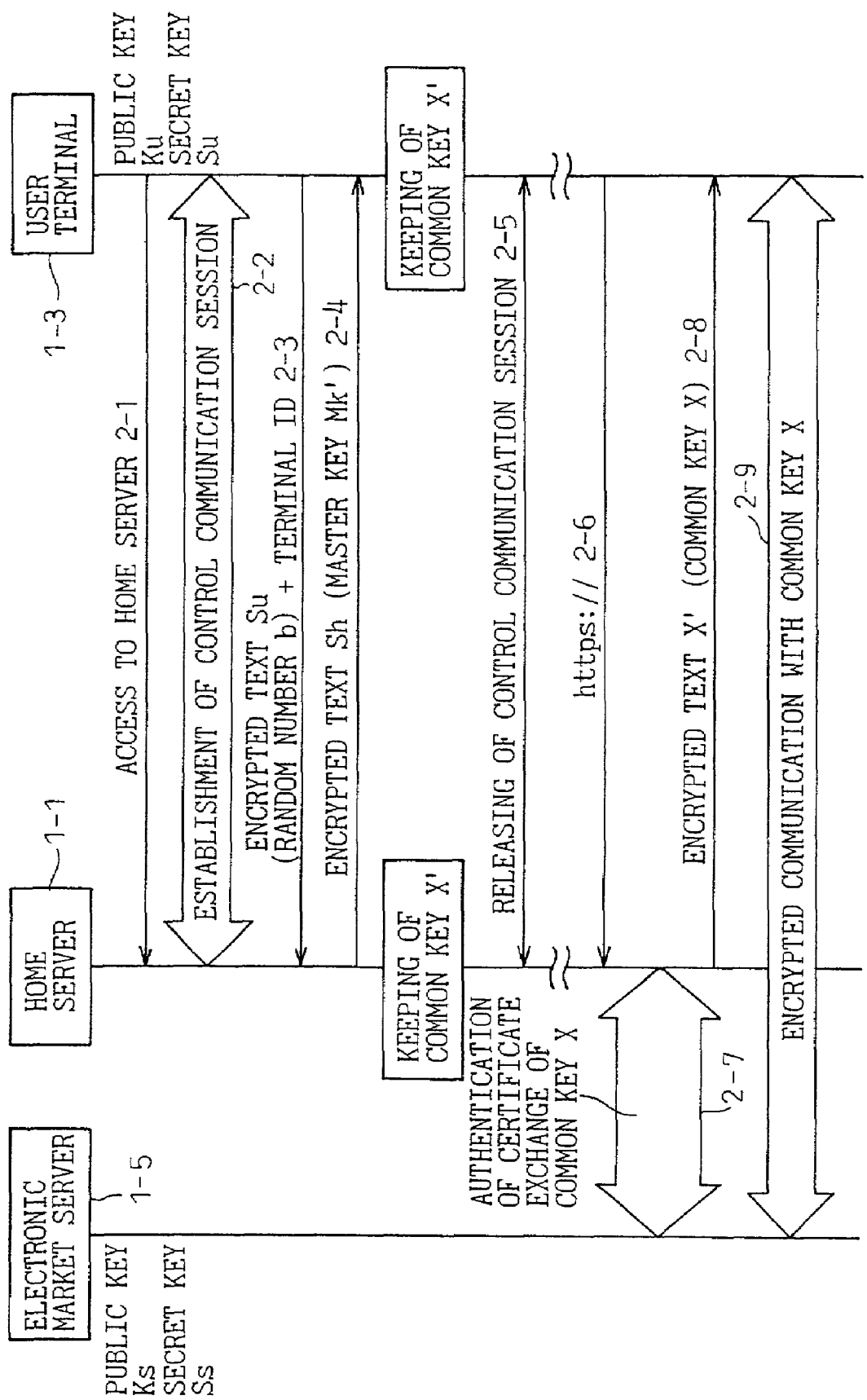
FIG. 2 shows a proxy process for authenticating and encrypting data according to the present invention.

FIG. 2 shows a proxy process for authenticating and encrypting data according to the present invention. In this case, the session of the control communication (i.e., encrypted communication) has been previously established using the access card between the user terminal 1-3 and the home server 1-1, the exchange process of the common key X' is executed in accordance with the following steps.

First, the user terminal 1-3 accesses the home card 1-2 in the home server 1-1 using the access card 1-4 (step 2-1) so that the session of the control communication (encrypted communication) is established between the user terminal 1-3 and the home server 1-1 (step 2-2). The user terminal 1-3 generates the random number "b" and encrypts the random number "b" by using the secret key Su of the user terminal 1-3. Further, the user terminal 1-3 transmits the encrypted random number "b" and an identification information ID of the user terminal 1-3 to the home server 1-1 based on the session of the control communication (encrypted communication), and requests the exchange of the common key (step 2-3).

The home server 1-1 accesses memory means which can access an inner or outer, reads the public key Ku corresponding to the identification information ID of the user terminal 1-3, and decrypts the random number "b". Further, the home server 1-1 generates a master key Mk' used as the common key, and prepares the common key X' by combining the master key Mk' and the random number "b". Further, home server 1-1 encrypts the master key Mk' by using the secret key Sh and transmits the encrypted master key to the user terminal 1-3 (step 2-4). In this case, the memory is provided in the home server or another equipment connected to the home server for storing the identification information of the user terminal and its public key Ku (the proxy facility in the home server is used for processing the encrypted information instead of the user terminal as explained in detail below).

The user terminal 1-3 decrypts the encryption text by the master key Mk' transmitted from the home server 1-1 by using the public key Kh of the home server 1-1, and generates the common key X' by combining the decrypted master key Mk' and the random number "b". After the above steps, the home server 1-1 and the user terminal 1-3 previously hold the common key X', and the session of the control communication (encrypted communication) is released between the home server 1-1 and the user terminal 1-3.

After the above steps, when the user executes the electronic commerce using the user terminal 1-3, the user terminal 1-3 accesses the home server 1-1, and transmits the session request (https://) for ensuring the security thereto (step 2-6). When the home server 1-1 receives the session request, the home server 1-1 executes the authentication process for mutual certificates and the exchange process of the common key X by using the public key and secret key (step 2-7).

Since the home server 1-1 is formed by a very large processor fixedly mounted on a certain place, the processing speed for operation and communication is very high compared to that of the user terminal 1-3 and has a very high data-processing ability. Accordingly, it is possible to execute the above steps including the exchange of the common key X at high speed in comparison with the user terminal 1-3.

Further, the home server 1-1 encrypts the information of the common key X which is exchanged between the home server 1-1 and the electronic market server 1-5, by using the common key X' which is exchanged between the user terminal 1-3 and the home server 1-1, and transmits the encrypted information to the user terminal 1-3 (step 2-8). The user terminal 1-3 decodes the encrypted text of the common key X and obtains the information of the common key X. After the above steps, the encrypted communication for the electronic commerce is executed between the user terminal 1-3 and the electronic market server 1-5 (step 2-9).

In the above steps, as another embodiment, the home server 1-1 decodes the encrypted communication with the electronic market server by using the common key X from the home server 1-1 to the user terminal 1-3 without notification of the common key X, encrypts the decoded text by using the common key X', and transmits the encrypted text to the user terminal 1-3. Further, the home server 1-1 decodes the encrypted text by using the common key X' from the user terminal 1-3, encrypts the decoded text by using the common key X, and transmits the encrypted text to the electronic market server 1-5.

Figure 3:
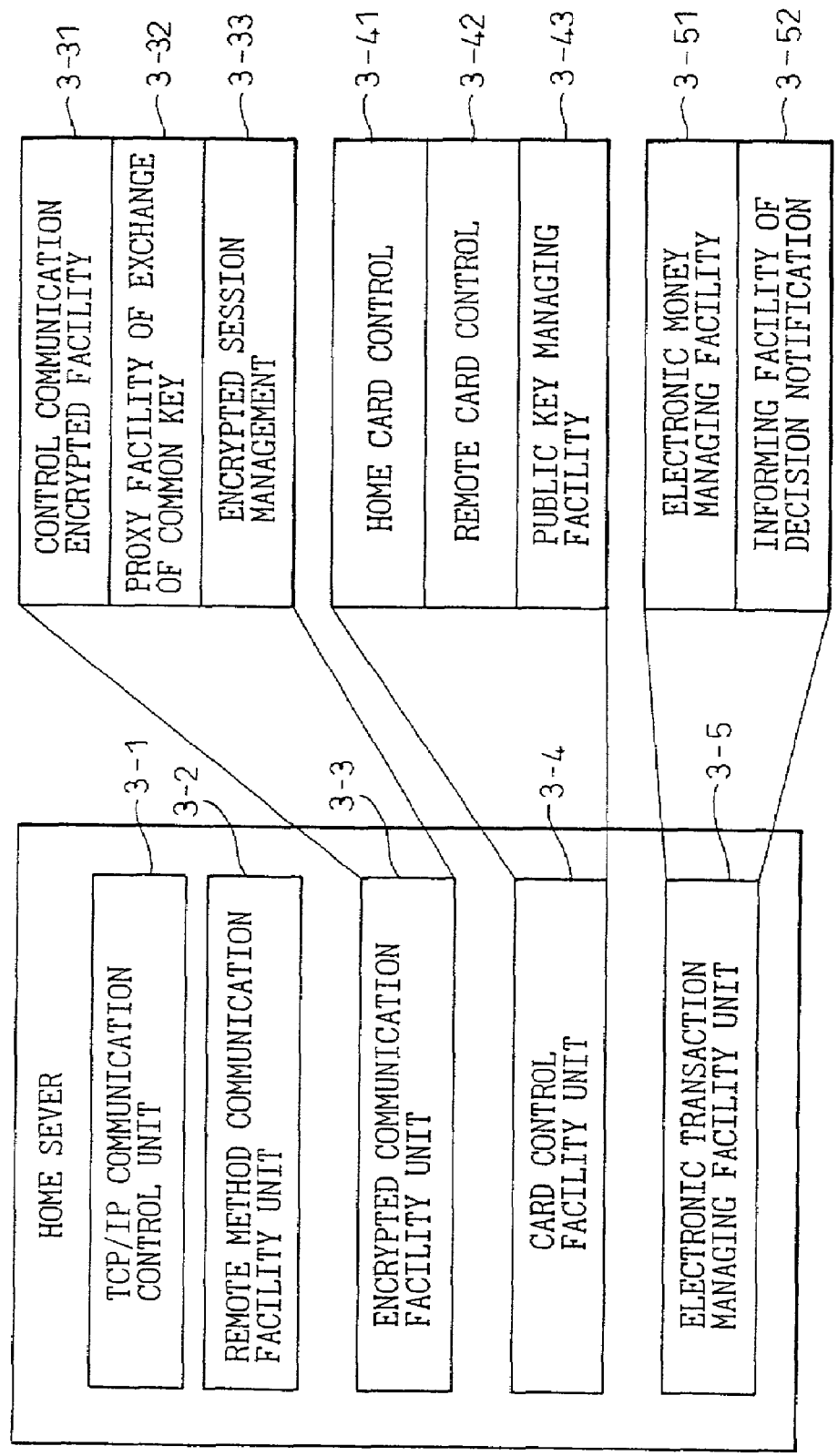
FIG. 3 shows a function block of a home server according to the present invention.

FIG. 3 shows a function block of the home server according to the present invention. The home server according to the present invention includes a TCP/IP communication control unit 3-1, a remote method communication facility unit 3-2, an encrypted communication facility unit 3-3, a card control facility unit 3-4, and electronic commerce managing facility unit 3-5.

The encrypted communication facility unit 3-3 includes a control communication encrypted facility 3-31, a proxy facility for exchanging a common key 3-32, and an encrypted session managing facility 3-33. The card control facility unit 3-4 includes a home card control facility 3-41, a remote card control facility 3-42 and a public key managing facility 3-43. Further, the electronic commerce managing facility unit 3-5 includes an electronic money managing facility 3-51 and an informing facility of decision notification 3-52.

Figure 4:
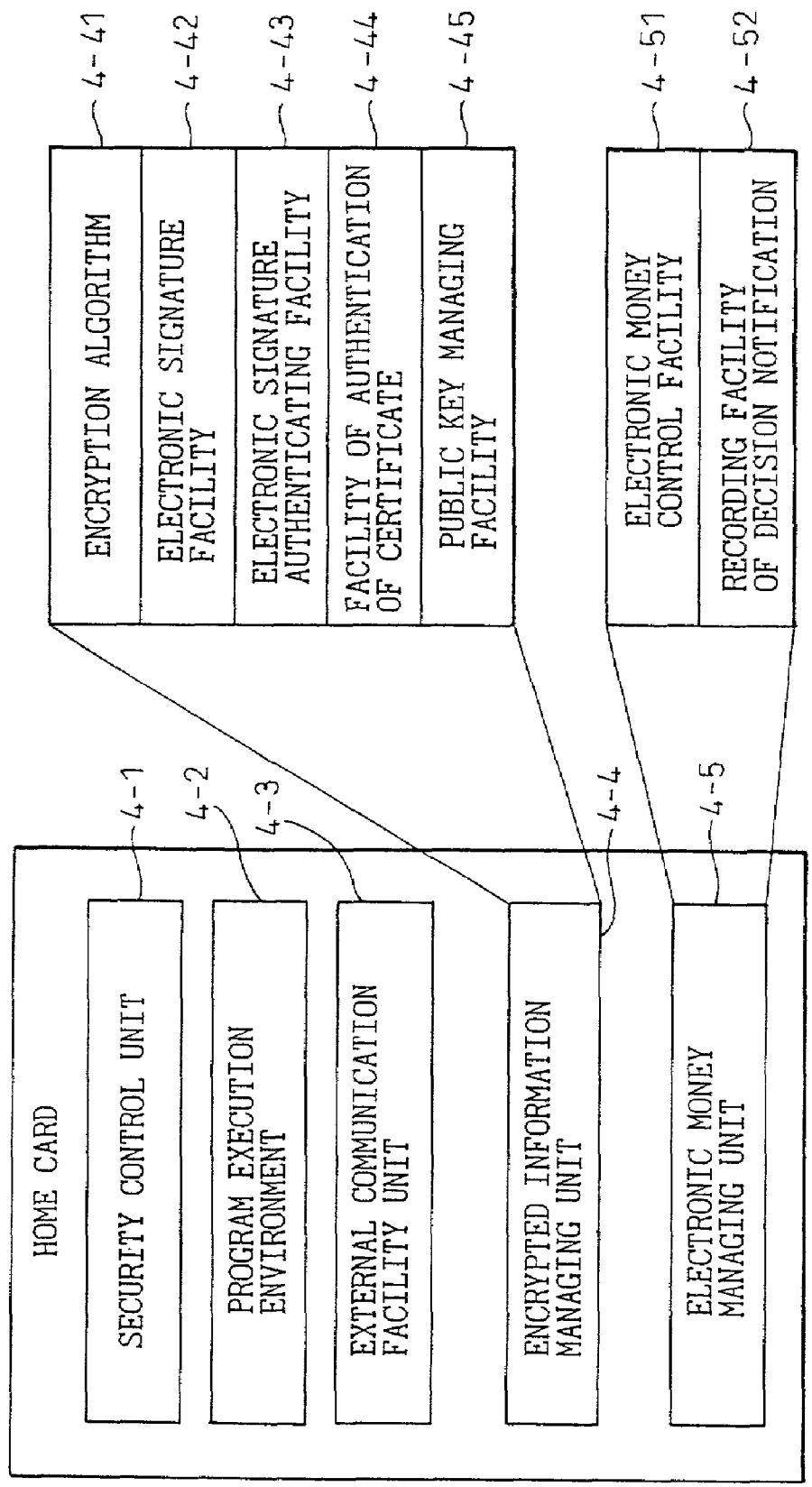
FIG. 4 shows a function block of a home card according to the present invention.

FIG. 4 shows a function block of the home card according to the present invention. The home card according to the present invention includes a security control unit 4-1, a program execution-environment setting unit 4-2, an external communication facility unit 4-3, an encrypted-information managing unit 4-4, and an electronic-money managing unit 4-5.

The encrypted-information managing unit 4-4 includes an encryption algorithm processing facility 4-41, an electronic signature facility 4-42, an electronic signature authenticating facility 4-43, a certificate authenticating facility 4-44 and a public key managing facility 4-45. The electronic-money managing unit 4-5 includes an electronic-money control facility 4-51 and a recording facility of decision notification 4-52.

Figure 5:
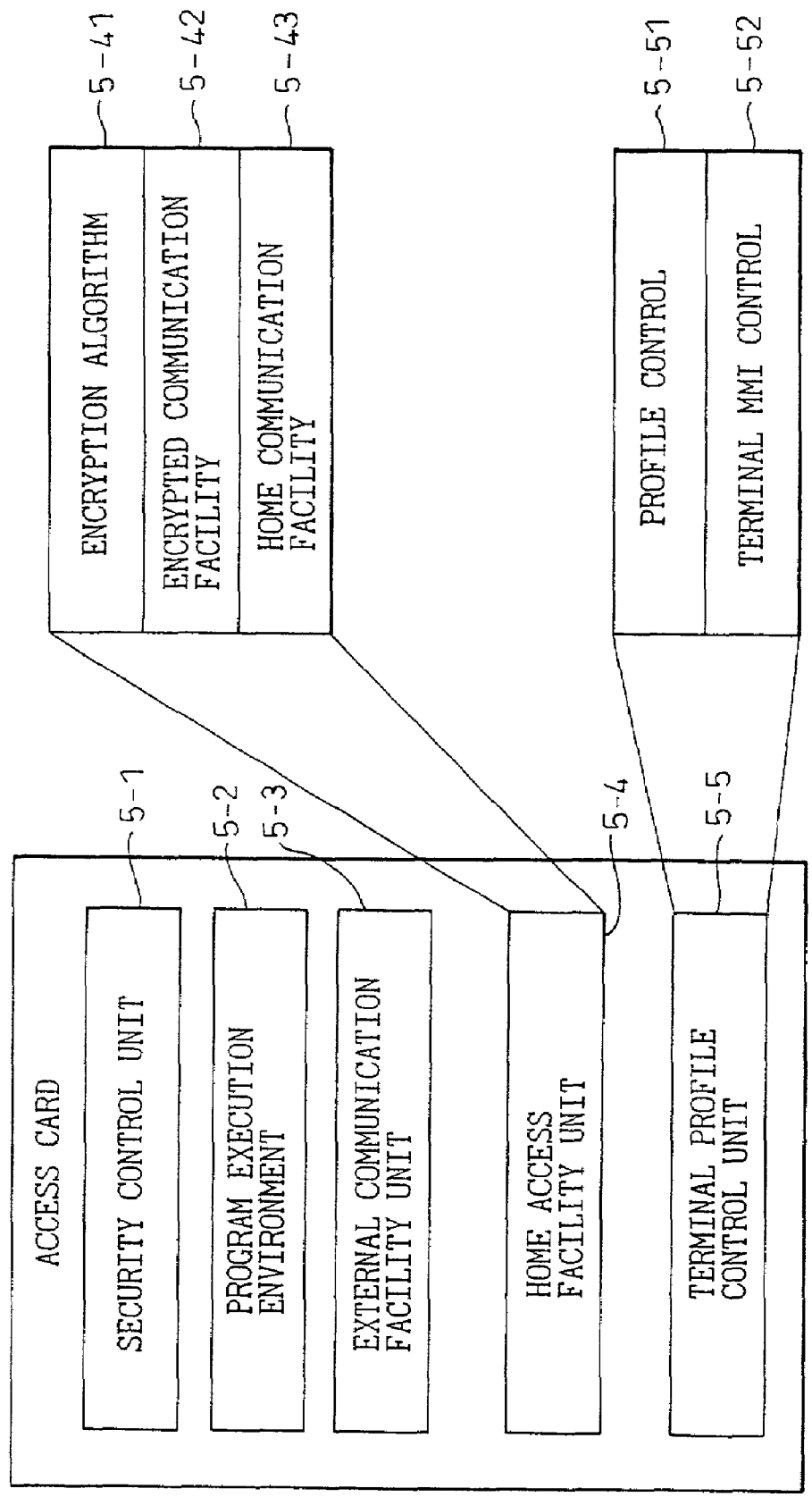
FIG. 5 shows a function block of an access card according to the present invention.

FIG. 5 shows a function block of the access card according to the present invention. The access card according to the present invention includes a security control unit 5-1, a program execution-environment setting unit 5-2, an external communication facility unit 5-3, a home access facility unit 5-4 and a terminal-profile control unit 5-5.

The home access facility unit 5-4 includes an encryption-algorithm processing facility 5-41, an encrypted communication facility 5-42 and a home communication facility 5-43.

The terminal-profile control unit 5-5 includes a profile control facility 5-51 and a terminal man-machine interface (MMI) control facility 5-52.

Figure 6:
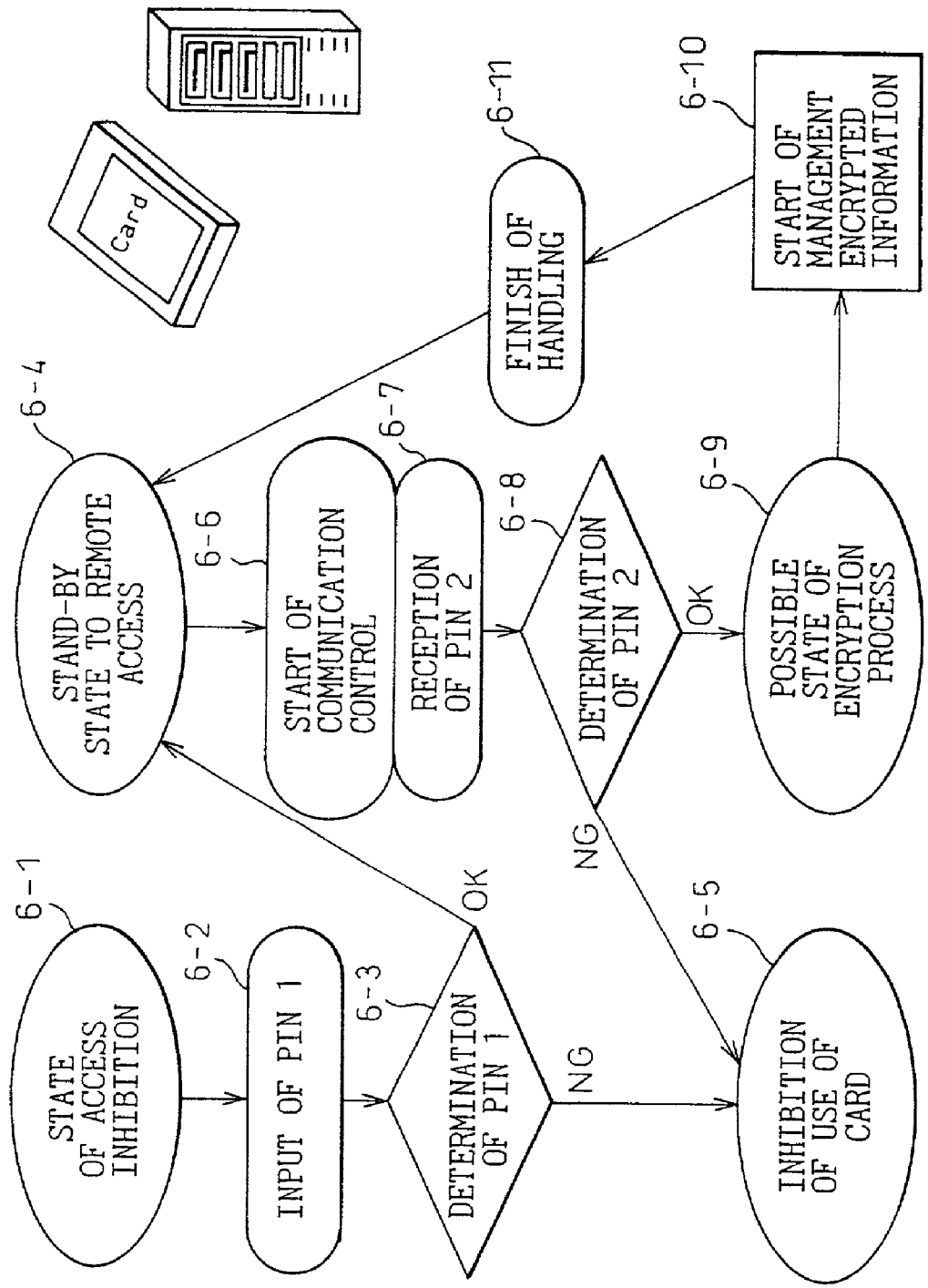
FIG. 6 shows a security control steps in the home card according to the present invention.

FIG. 6 shows a security control steps in the home card according to the present invention. The home card 1-2 according to the present invention is usually set to a state of access inhibition by the hardware (step 6-1). When a first personal-identification number (PIN1) corresponding to a password, which can be re-written by the user, is input to the home card 1-2 (step 6-2), the home card 1-2 determines whether or not the first personal-identification number (PIN1) is authorized (step 6-3). When the PIN1 is authorized, the home card 1-2 is set to a stand-by state from remote access (step 6-4). In the step 6-3, when the PIN1 is not continuously authorized during trials of predetermined times (for example, three times), the home card 1-2 is set to a state of inhibition of use (step 6-5).

After completion of stand-by state due to the remote access, the home card 1-2 starts the encrypted control communication with the access card 1-4 (step 6-6). When the home card 1-2 receives a second personal-identification number (PIN2) (step 6-7), the home card 1-2 determines whether or not the second personal-identification number (PIN2) is authorized (step 6-8). In this step, when the PIN2 is not continuously authorized during trials of predetermined times (for example, three times), the home card 1-2 is set to the state of inhibition of use (step 6-5).

When the home card 1-2 receives the authorized PIN2 in step 6-8, the home card 1-2 is shifted from the standby state to a possible state of encryption process (step 6-9). When the home card 1-2 is set to the possible state of encryption process, the encrypted-information managing unit 4-4 in the home card 1-2 is started (step 6-10). In this state, the home card 1-2 executes the encrypted/decrypted processes and authentication/electronic signature processes. When the home card 1-2 receives information of finish of handling of the encryption from the user terminal 1-3, or when the home card 1-2 does not receive the access for a certain period (for example, during ten minutes) from the user terminal 1-3, the home card 1-2 determines the finish of handling of the encryption (step 6-11), and the process returns to the stand-by state from the remote access (see step 6-4).

FIG. 7 shows access control steps using the access card according to the present invention. The access control using the access card is executed by using the personal identification number (PIN), which is used as the password and can be rewritten by the user, or by using bio-authentication. In this case, the bio-authentication is used for confirming a user by using a fingerprint, a voiceprint, an iris, or a holograph.

The access card is usually set to the state of access inhibition based on the hardware logic circuit (step 7-1). When the home card 1-2 receives either the personal identification number (PIN), or the bio-authentication from the user, (step 7-2), the home card 1-2 determines whether or not the personal identification number (PIN) or the bio-authentication is authorized (step 7-3). When it is authorized, the home card is shifted to the possible state of the access (step 7-4). On the other hand, in the step 7-3, when the identification number is not continuously authorized during trials of a predetermined times (for example, three times), the access card is set to the state of inhibition of use (step 7-5).

When the access card is shifted to the accessable state, the terminal profile control unit 5-5 is started (step 7-5), the access control from the user terminal 1-3 is set to a valid state. After the above steps, when the end of handling is informed by the user, or when the access is not executed during a predetermined period (for example, during ten minutes), the access card determines the finish of handling (step 7-6) and is shifted to the state of the access inhibition (step 7-1).

Figure 8B:
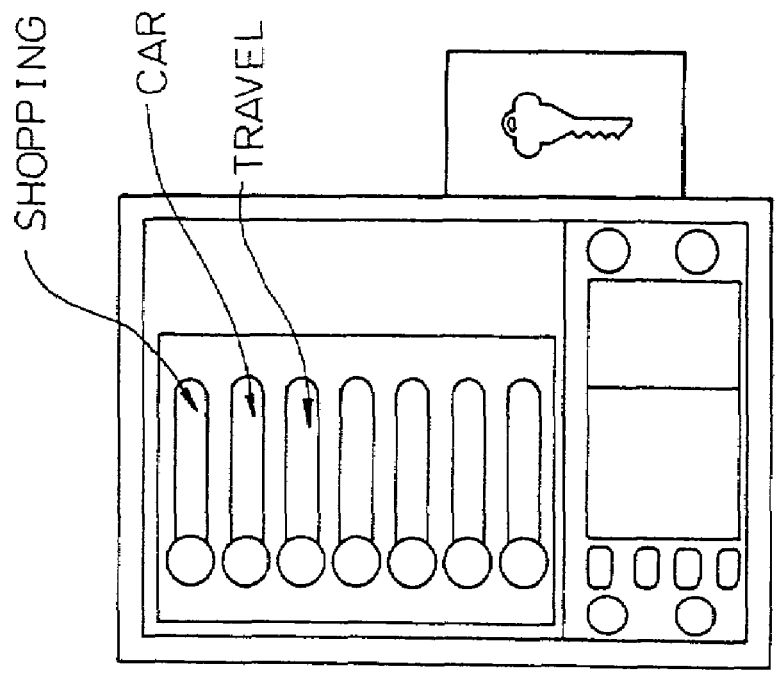
FIGS. 8A and 8B show one example of a display image on a user terminal according to the present invention.
Figure 8A:
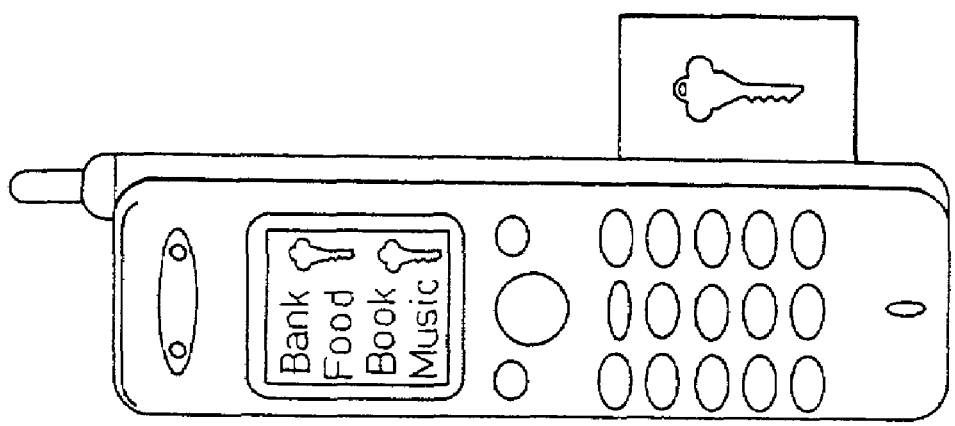

FIGS. 8A and 8B show one example of display image on the user terminal according to the present invention. FIG. 8A is in the case of the wireless hand-held phone, and FIG. 8B is in the case of the personal digital assistant (PDA). In these display images on the user terminal, the display and operation images that are preferable for the kind of the user terminal are selected and displayed in accordance with the function of the terminal profile control unit 5-5 in the access card 1-4.

Figure 9:
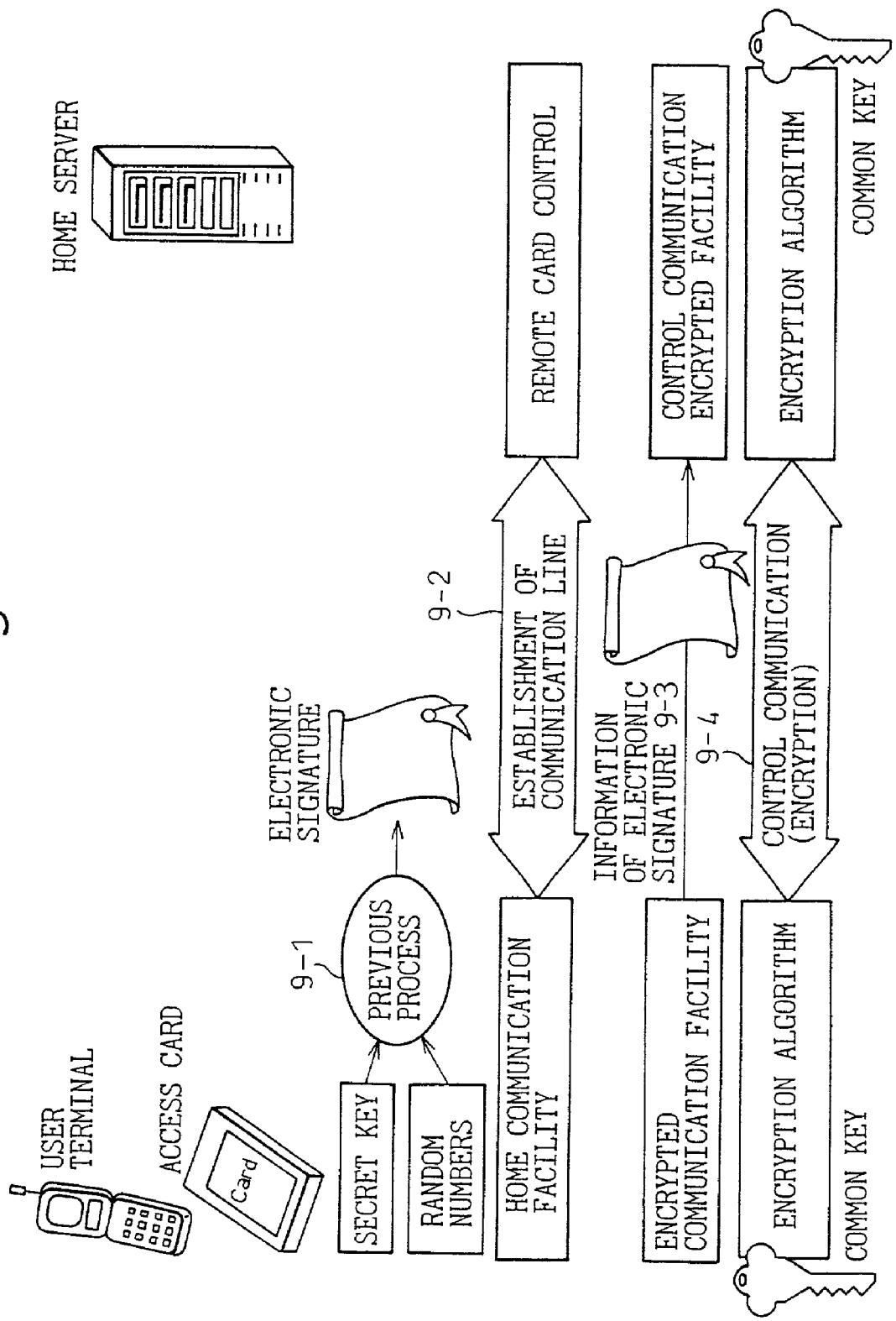
FIG. 9 shows encryption procedures for control communication according to the present invention.

FIG. 9 shows encryption procedures for control communication according to the present invention. First, the user terminal, such as hand-held phone, prepares the electronic signature as the previous process before start of the encryption communication based on the secret key and the generating function of random numbers in the access card (step 9-1). In order to establish the encrypted control communication between the user terminal and the home server, the communication line is established by using the home communication facility 5-43 in the access card and the remote card control facility 3-42 in the home server (step 9-2). The previous electronic signature is informed to the control communication encrypted facility 3-31 of the home server by using the encrypted communication facility 5-42 of the access card (step 9-3) so that it is possible to inform in safety the authentication of the client and the random numbers used for preparing the common key to the home server. Accordingly, it is possible to execute the encrypted communication between the access card of the user terminal and the home server, based on the encrypted algorithm using the above-explained common key X' (step 9-4).

Figure 10:
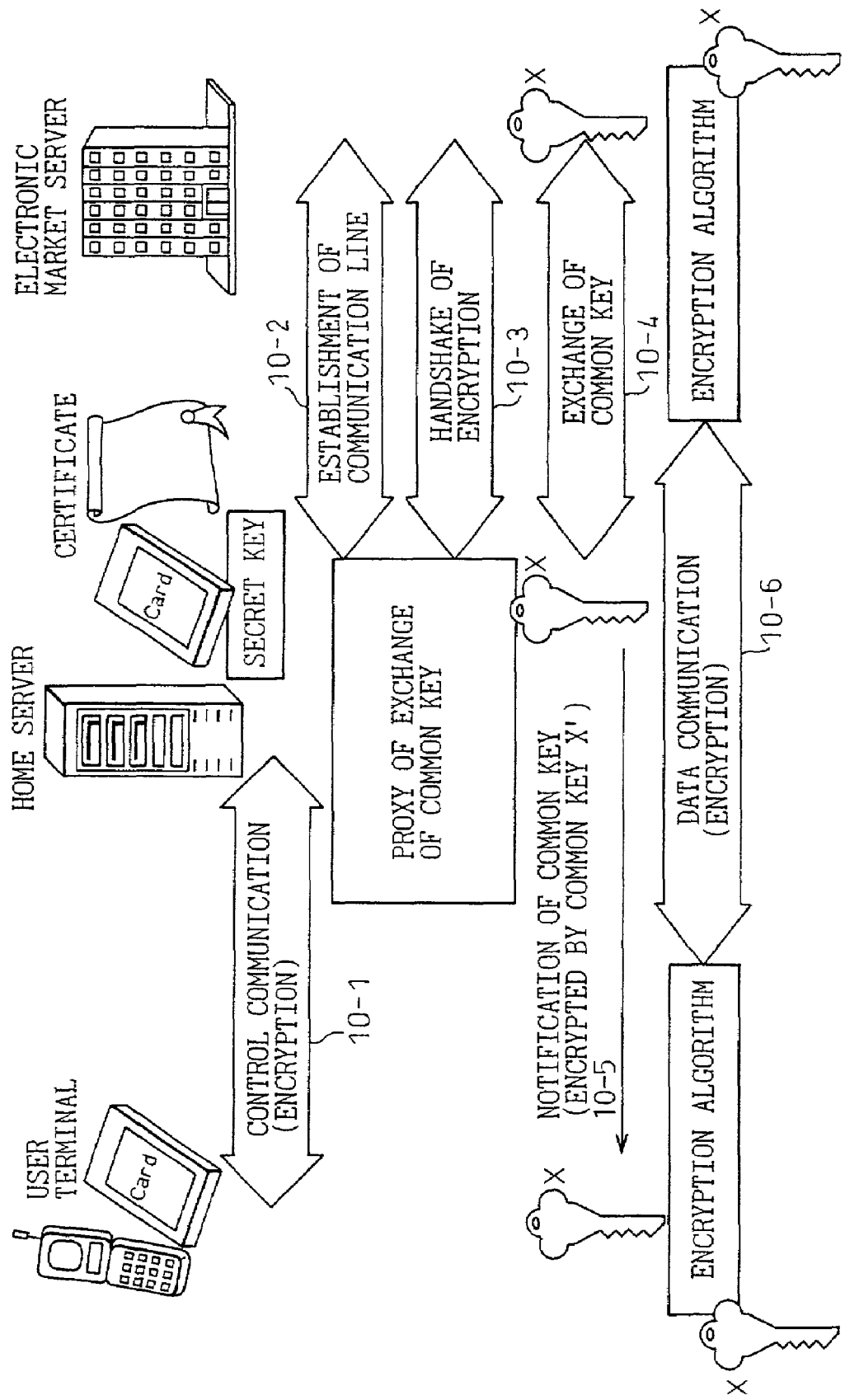
FIG. 10 shows encryption procedures for data communication according to the present invention.
Figure 11:
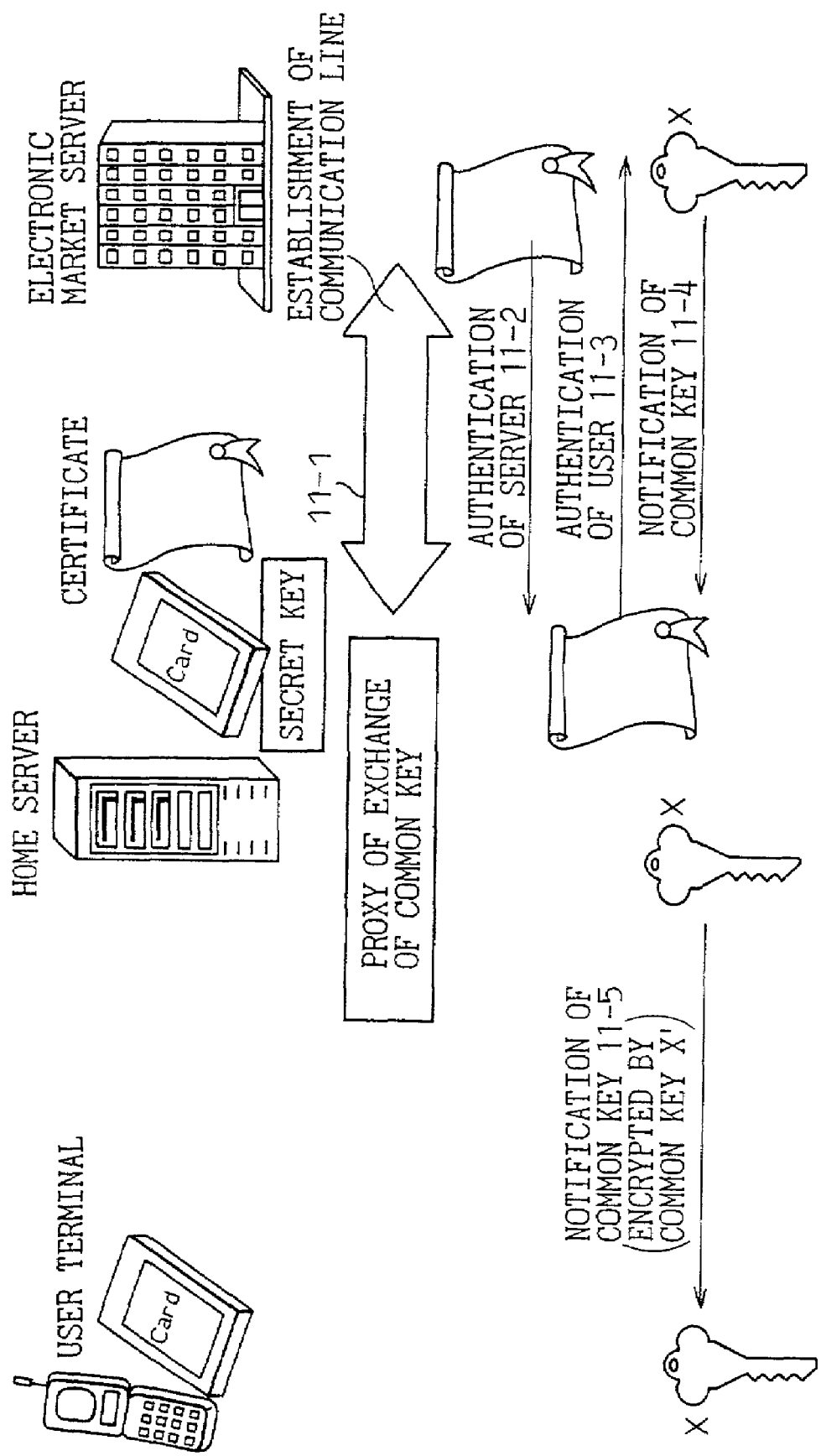
FIG. 11 shows a proxy process for exchanging a common key according to the present invention.

FIG. 10 shows encryption procedures for data communication according to the present invention, and FIG. 11 shows proxy processes for exchanging the common key according to the present invention. As explained above, it is possible to execute the encrypted communication between the access card of the user terminal and the home server, based on the encrypted algorism using the common key X' (step 10-1).

When the home server 1-1 receives an access request from the user terminal 1-3 to the electronic market server 1-5, the home server 1-1 executes the proxy process for exchanging the common key for the electronic market server 1-5, instead of the user terminal 1-3. In the proxy process for exchanging the common key, the communication line is established between the home server and the electronic market server (step 10-2). After establishment, handshaking for encryption is executed by using the secret key stored in the home card and the user's certificate (step 10-3) and the exchange of the common key X is executed between the home server and the electronic market server (10-4).

The home server encrypts the common key X by using the common key X' between the user terminal and the home server and informs the common key to the user terminal (step 10-5). The user terminal executes the encrypted data communication with the electronic market server by using the common key based on the encryption algorithm (step 10-6).

FIG. 11 shows proxy process for exchanging the common key. The home server establishes the communication line with the electronic market server (step 11-1). Further, by using the secret key and the user's certificate stored in the home card, the electronic market server executes the server's certificate (step 11-2), and the home server executes the client's (user's) certificate (step 11-3). The electronic market server informs the common key X to the home server (step 11-4). The home server informs the common key information encrypted by the common key X' to the user terminal (step 11-5).

Figure 12:
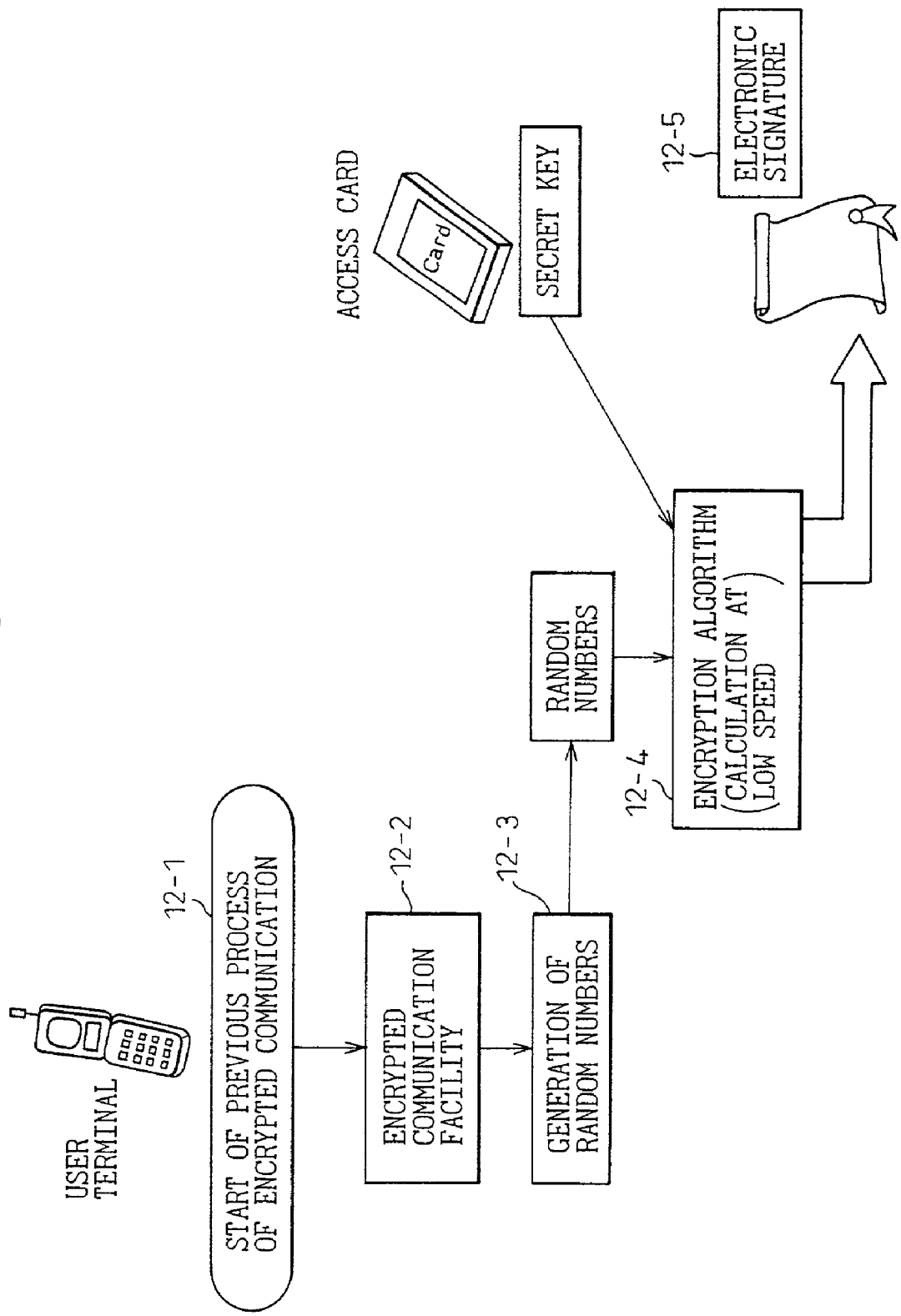
FIG. 12 shows previous processes for encrypted communication using the access card.

FIG. 12 shows previous processes for encrypted communication using the access card. The previous process of the encrypted communication is started in accordance with the instructions by the user at an optional time before the encrypted communication when the communication has not yet started in the electronic commerce (step 12-1). Further, the encrypted communication facility (see 5-42 in FIG. 5) in the access card is operated (step 12-2). The encrypted communication facility generates the random numbers (step 12-3), utilizes the encrypted algorithm based on the secret key in the access card and the random numbers (step 12-4) and prepares the electronic signature as the previous process before start of the encrypted communication (step 12-5).

In the preparation of the electronic signature based on the encrypted algorism, there is no charge for a communication fee because the above process is executed before start of the communication (i.e. previous process). In this case, since only one process is executed between the access card and the home server in order to exchange the common key X', the delay of the process time due to the previous process is very small and it is possible to execute the operation process at low speed.

Figure 13:
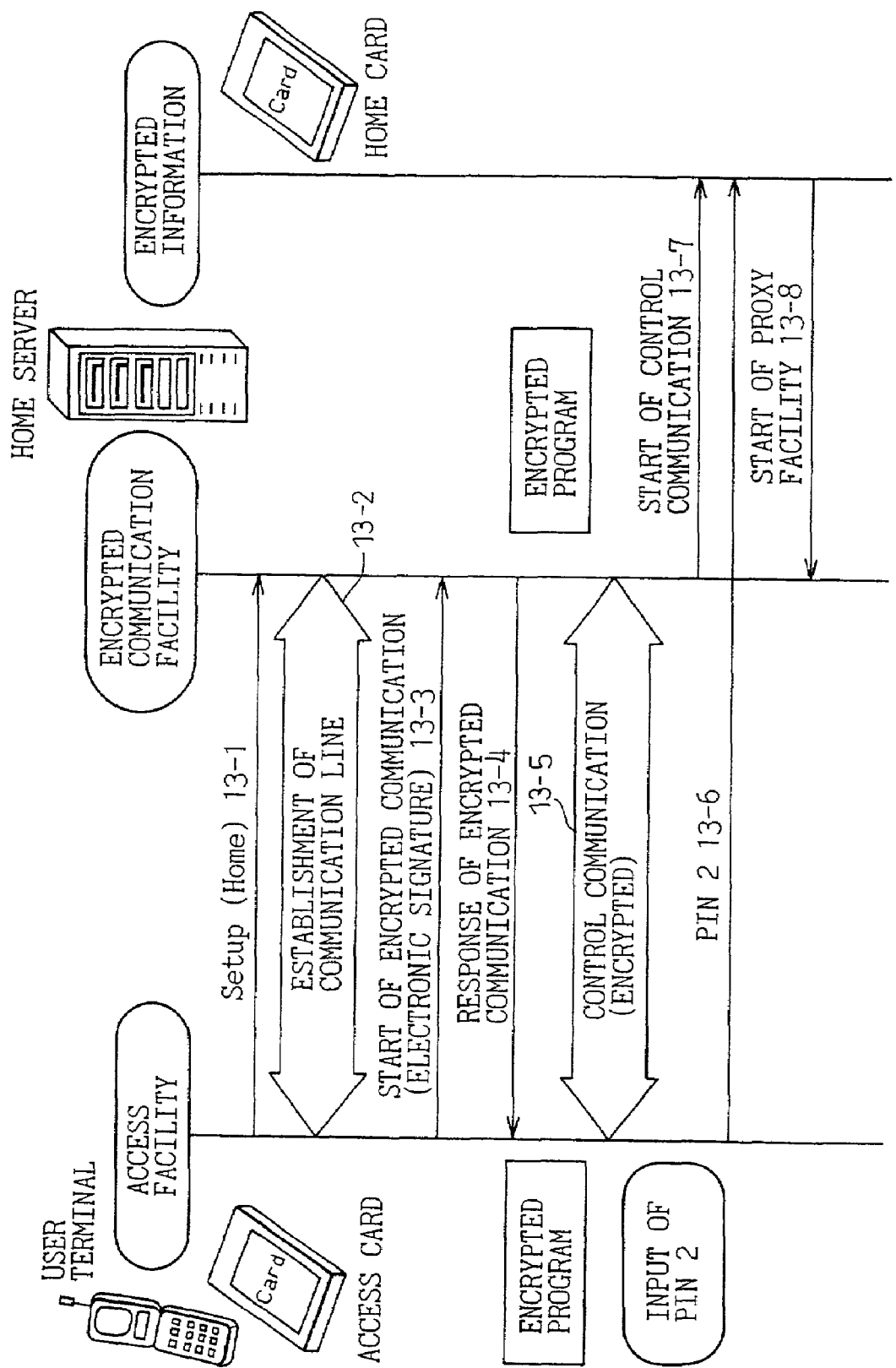
FIG. 13 shows process steps for executing control communication according to the present invention.

FIG. 13 shows process steps for executing the control communication according to the present invention. Using the home access facility (see 5-4 in FIG. 5) in the access card of the user, the Setup information is transmitted from the user terminal to the home server with a fixed destination (step 13-1). When the communication line is established between the user terminal and the electronic market server (step 13-2), the user terminal informs the electronic signature, which has been prepared in the previous process, to the home server so that the encrypted communication is started (step 13-3).

The home server executes the user's certificate and returns the response of the encrypted communication to the user terminal (step 13-4). As a result, the encrypted control communication is executed between the user terminal and the home server based on the encrypted program (steps 13-5 and 13-7). After start of the encrypted communication, when the user terminal informs the personal identification number (PIN2) for releasing the security of the home card (step 13-6), the proxy facility in the home server is started based on the program in the home card (step 13-8).

Figure 14:
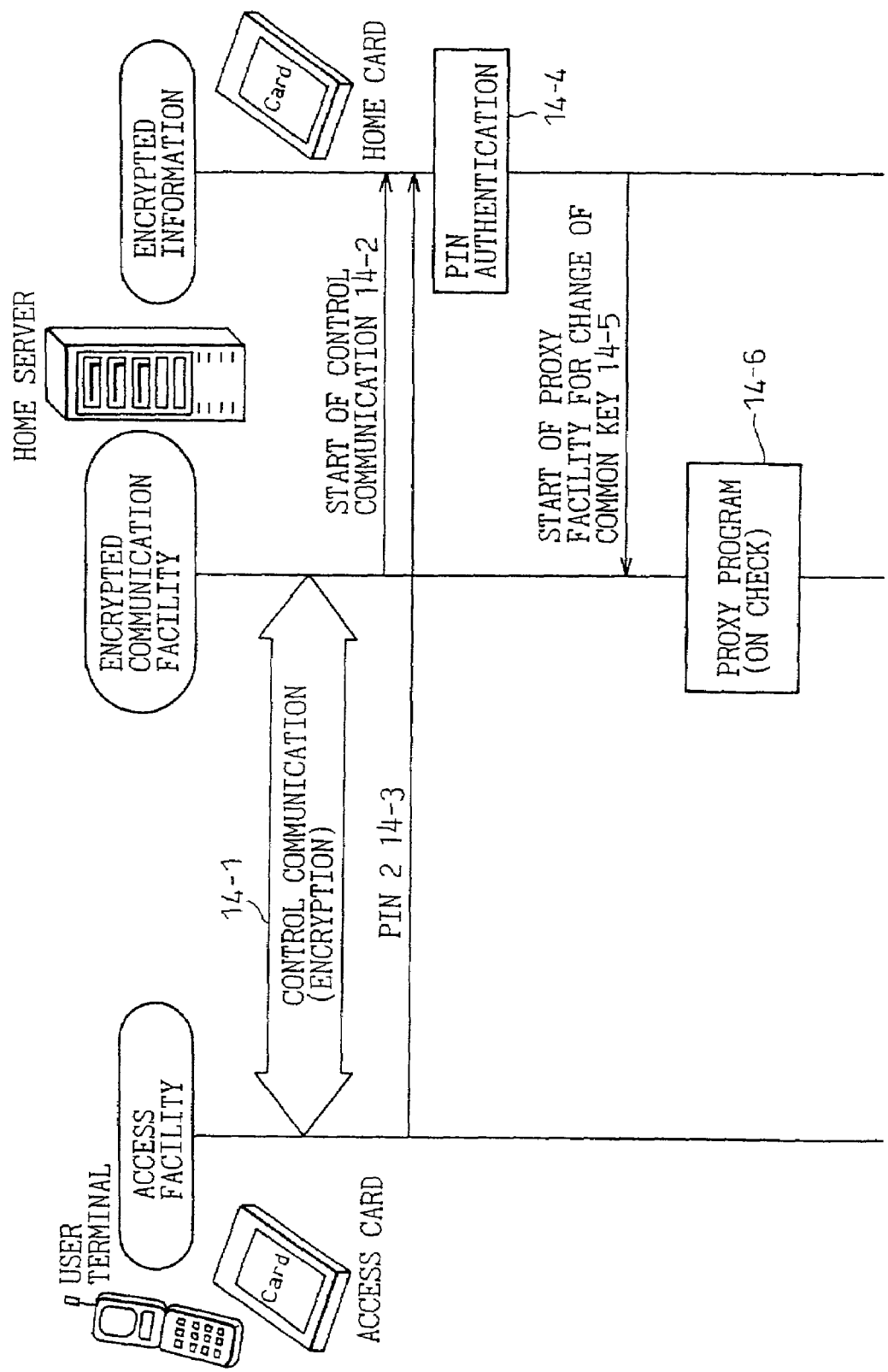
FIG. 14 shows process steps for remote control of the home card according to the present invention.

FIG. 14 shows process steps for remote control of the home card according to the present invention. When the encrypted control communication is started between the access facility in the access card and the encrypted communication facility (step 14-1), the home server informs the start of the encrypted control communication to the home card (step 14-2). After the above steps, when the user terminal informs the personal identification number (PIN2) for releasing the security of the home card (step 14-3), the home card authenticates the personal identification number (PIN2) by using the program in the home card (step 14-4). The home card starts the proxy facility for exchanging the common key for the home server (step 14-5). In this case, a proxy program for the home server is set to a state for checking start of the encrypted communication (step 14-6).

Figure 15:
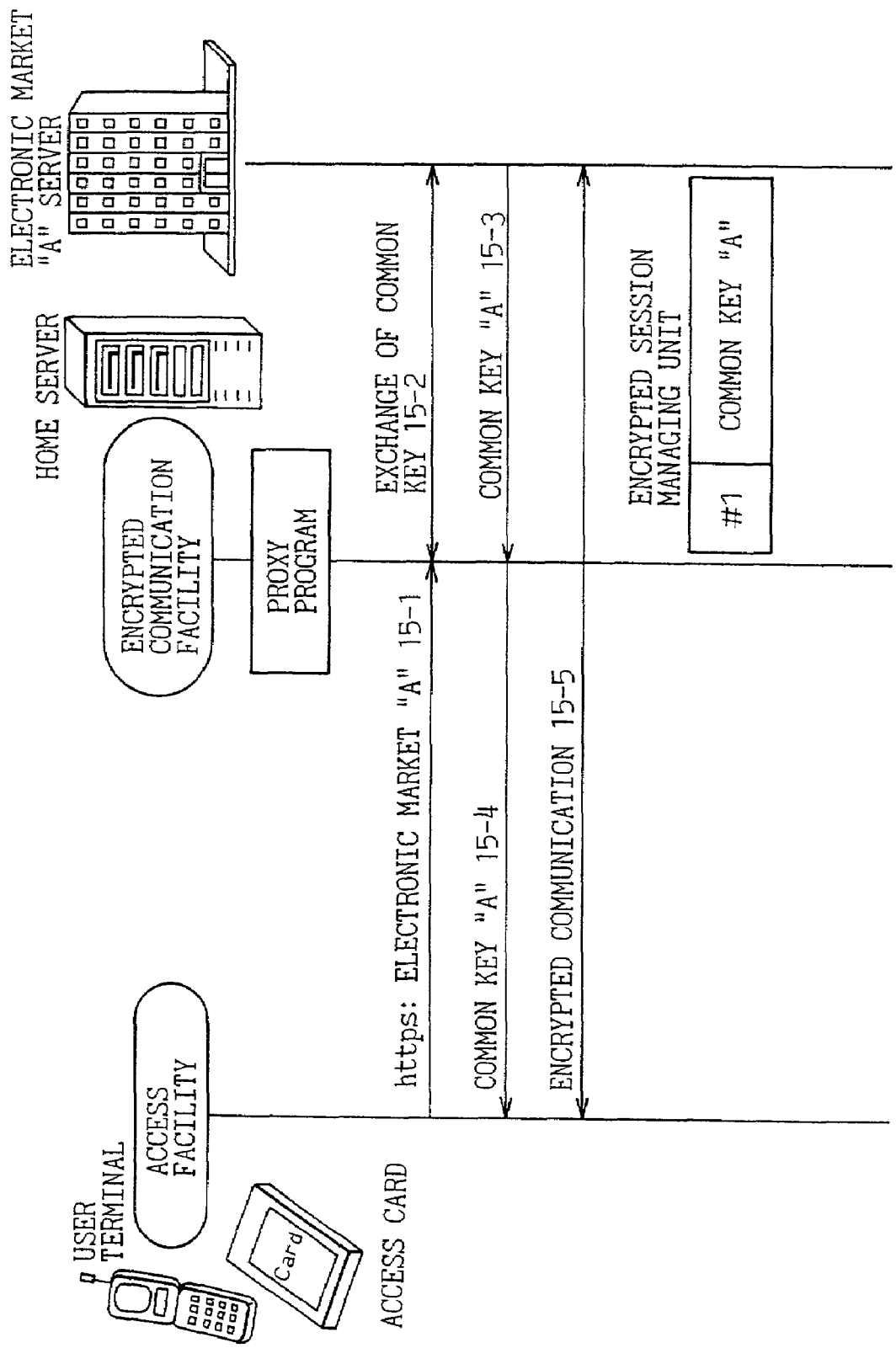
FIG. 15 shows access steps from the user to an electronic market in the case of one session.

FIG. 15 shows access steps from the user to the electronic market in the case of one session. When establishing the encrypted session (for example, https) between the user terminal and the server of the electronic market A, the user terminal transmits a request of start of the encrypted session to the encrypted communication facility (step 15-1). When the proxy program detects the request of the start of the encrypted session, the home server executes the exchange of the common key instead of the user terminal between the proxy program and the server of the electronic market A. (step 15-2).

When the server of the electronic market A informs the common key A to the home server (step 15-3), the home server informs the common key A to the user terminal (step 15-4), and stores the session number and the common key information by using the encrypted session managing unit in the home server. The user terminal starts the encrypted communication with the server of the electronic market by using the common key A (step 15-5).

Figure 16:
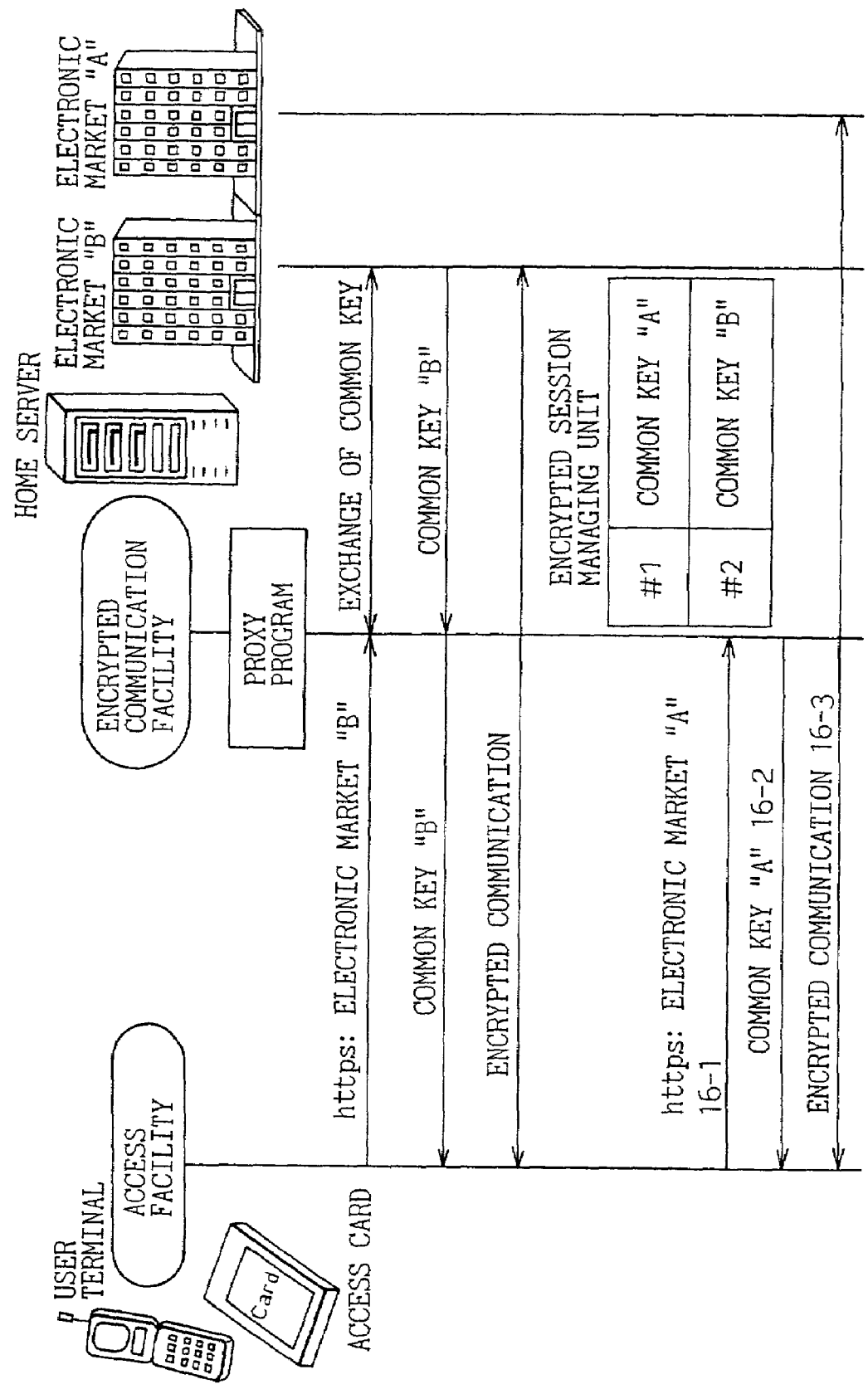
FIG. 16 shows access steps from the user to the electronic market in the case of plural sessions.

FIG. 16 shows access steps from the user to the electronic market in the case of plural sessions. It is assumed that the encrypted communication has been executed between the user terminal and the server of the electronic market B in accordance with the procedures shown in FIG. 15. When the user terminal requests the establishment of the encrypted session (for example, https) to the electronic market A that has previously executed the encrypted communication (step 16-1), the home server refers to the session number and the common key information stored in the encryption session managing unit, and transmits the common key A stored in the encryption session managing unit without exchange of the common key once more to the server of the electronic market A. (step 16-2). As a result, it is possible to execute the encrypted communication between the user terminal and the server of the electronic market A (step 16-3).

Figure 17:
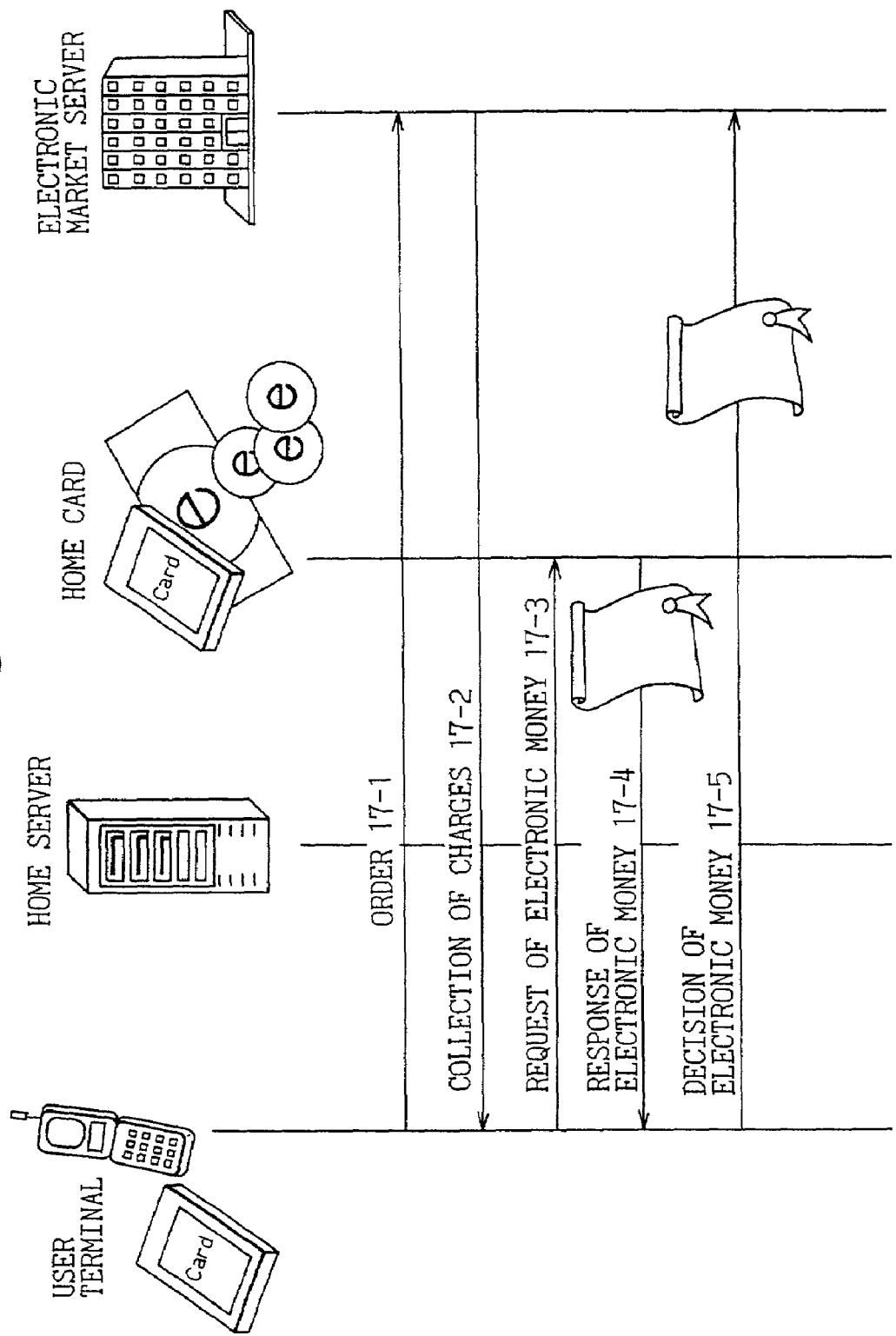
FIG. 17 shows steps of collecting charges of electronic money.

FIG. 17 shows steps of collecting charges of electronic money. The electronic money is stored in the home card. When the user orders goods from the user terminal to the electronic market server (step 17-1), the electronic market server informs collection of charges to the user terminal (step 17-2). After the above steps, the user terminal issues a request for electronic money to the home card (step 17-3).

The home card subtracts charges to be collected from the electronic money, and transmits a response of the electronic money, to which the common key of an electronic-money managing bank and the electronic signature using the secret key of the user are attached, to the user terminal (step 17-4). Further, the user terminal executes the decision of the electronic money and informs the result of the decision to the electronic market server (step 17-5).

Figure 18:
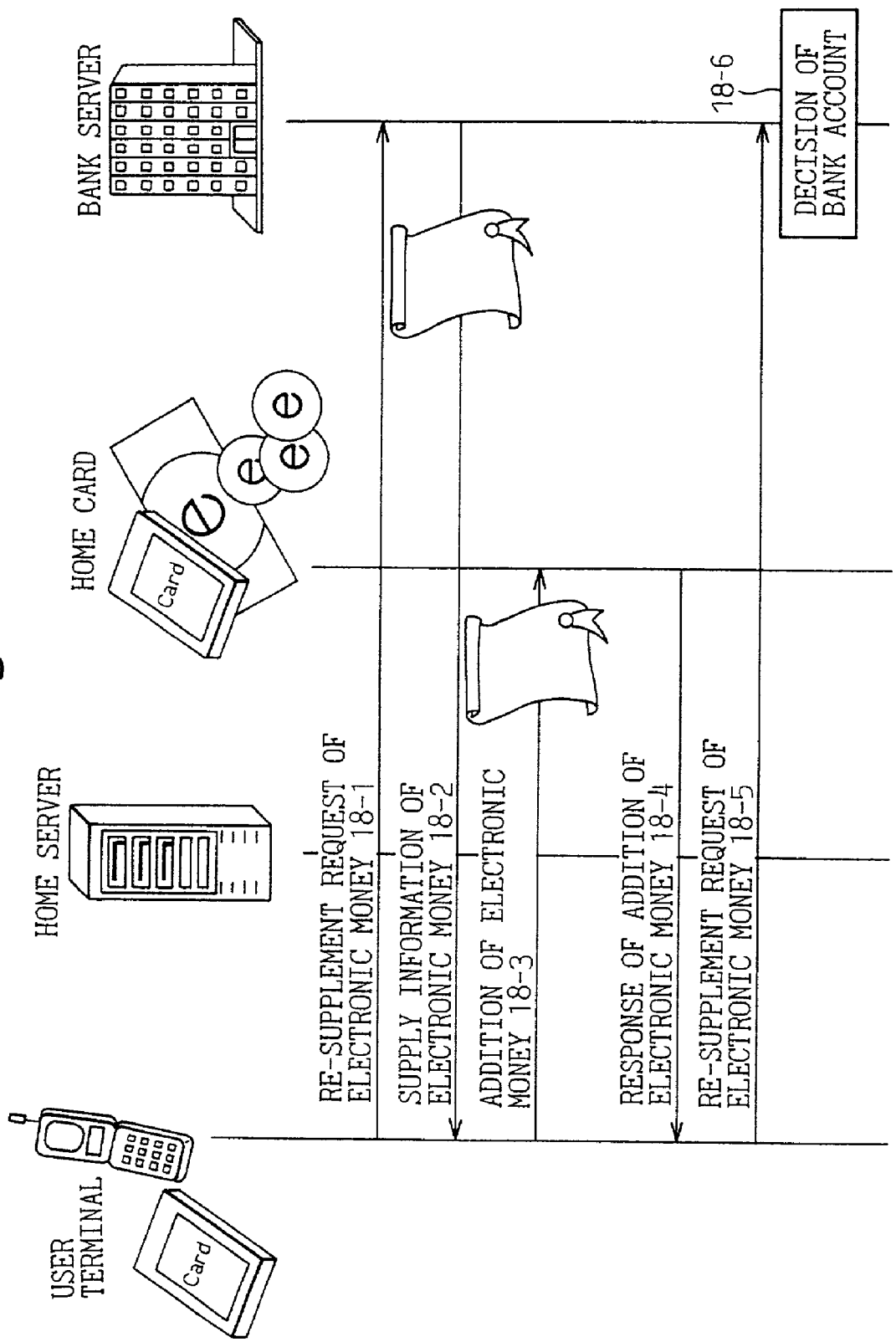
FIG. 18 shows re-supplement steps for electronic money.

FIG. 18 shows re-supplement steps of the electronic money. The user terminal transmits a request for re-supplement of the electronic money to a bank server (step 18-1). When the bank server receives the request from the user terminal, the bank server informs supplement of the electronic money with the electronic signature by using the secret key of the bank server and the public key of the user (step 18-2).

The user terminal informs the electronic money with the electronic signature to the home card, and adds the electronic money to the home card (step 18-3). The home card transmits a response for addition of the electronic money to the user terminal (step 18-4). When the user terminal receives the response from the home card, the user terminal transmits a response of re-supplement of the electronic money to the bank server (step 18-5). When the bank server receives the response from the user terminal, the bank server executes decision of an account of the user (step 18-6).

Figure 19:
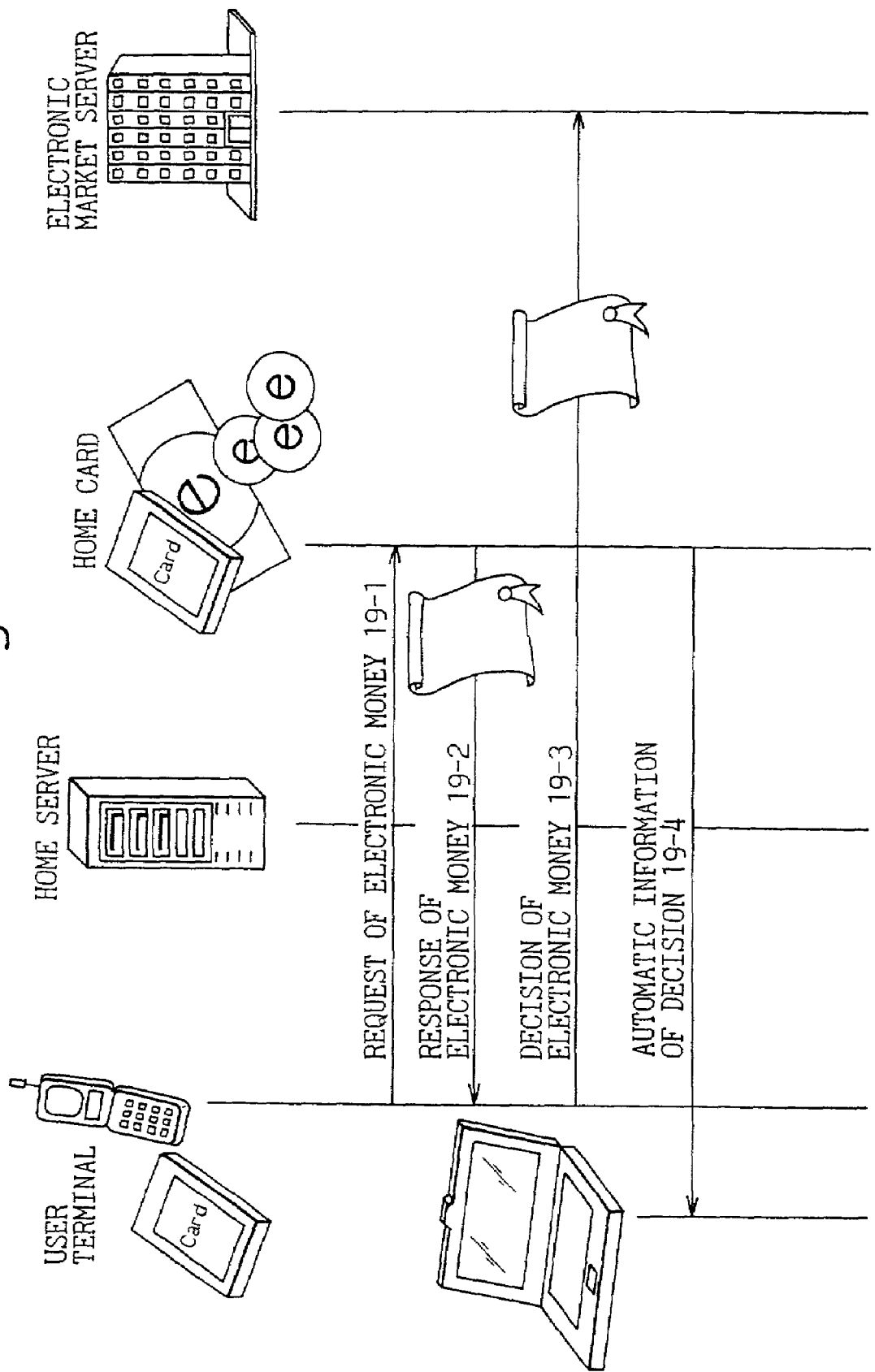
FIG. 19 shows steps of automatically informing decision information.

FIG. 19 shows steps of automatically informing decision information. When the user terminal requests the electronic money to the home card (step 19-1), the home card returns a response of the electronic money with the electronic signature to the user terminal (step 19-2). When the user terminal receives the response from the home card, the user terminal transmits decision of the electronic money with the electronic signature to the electronic market server (step 19-3).

When the electronic market server executes a decision on the electronic money, the home card automatically records the decision of the electronic money, and periodically informs the information of the decision to a mail address designated by the user (step 19-4). As a result, it is possible for the user to quickly check for an unauthorized decision caused by unauthorized use of the home card.

Figure 20:
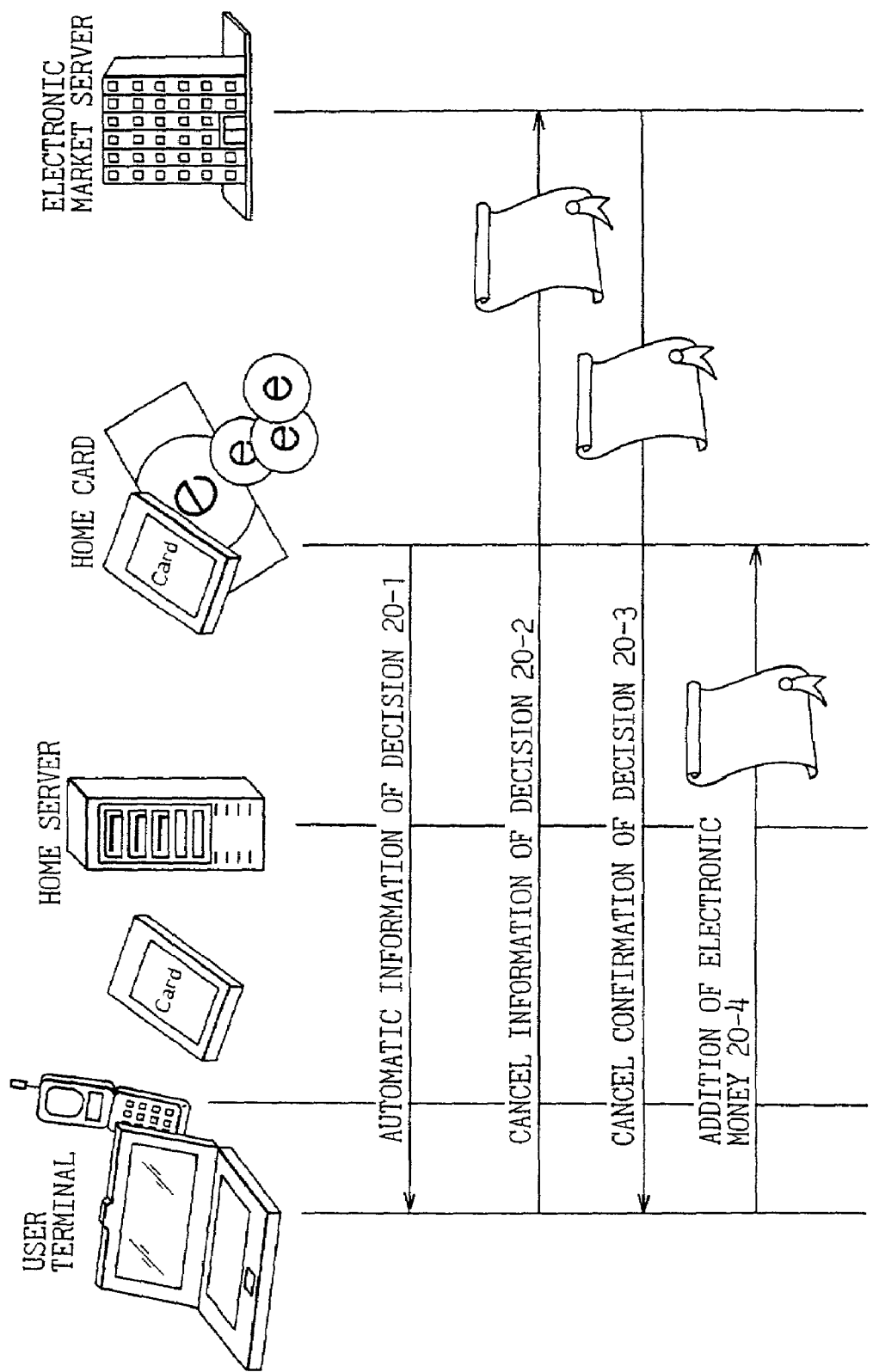
FIG. 20 shows steps of canceling the contents of decision according to the present invention.

FIG. 20 shows steps of canceling the contents of decision according to the present invention. As mentioned above, the home card automatically informs the decision information to the mail address designated by the user (step 20-1). When the user terminal informs a notice of cancel of decision with the electronic signature to the electronic market server step 20-2), the electronic market server transmits confirmation of cancel of the decision with the electronic signature to the user terminal (step 20-3). When the user terminal receives the confirmation, the user terminal transmits instructions for adding again the electronic money, which was already paid in the decision, to the home card with the electronic signature (step 20-3).

Figure 21:
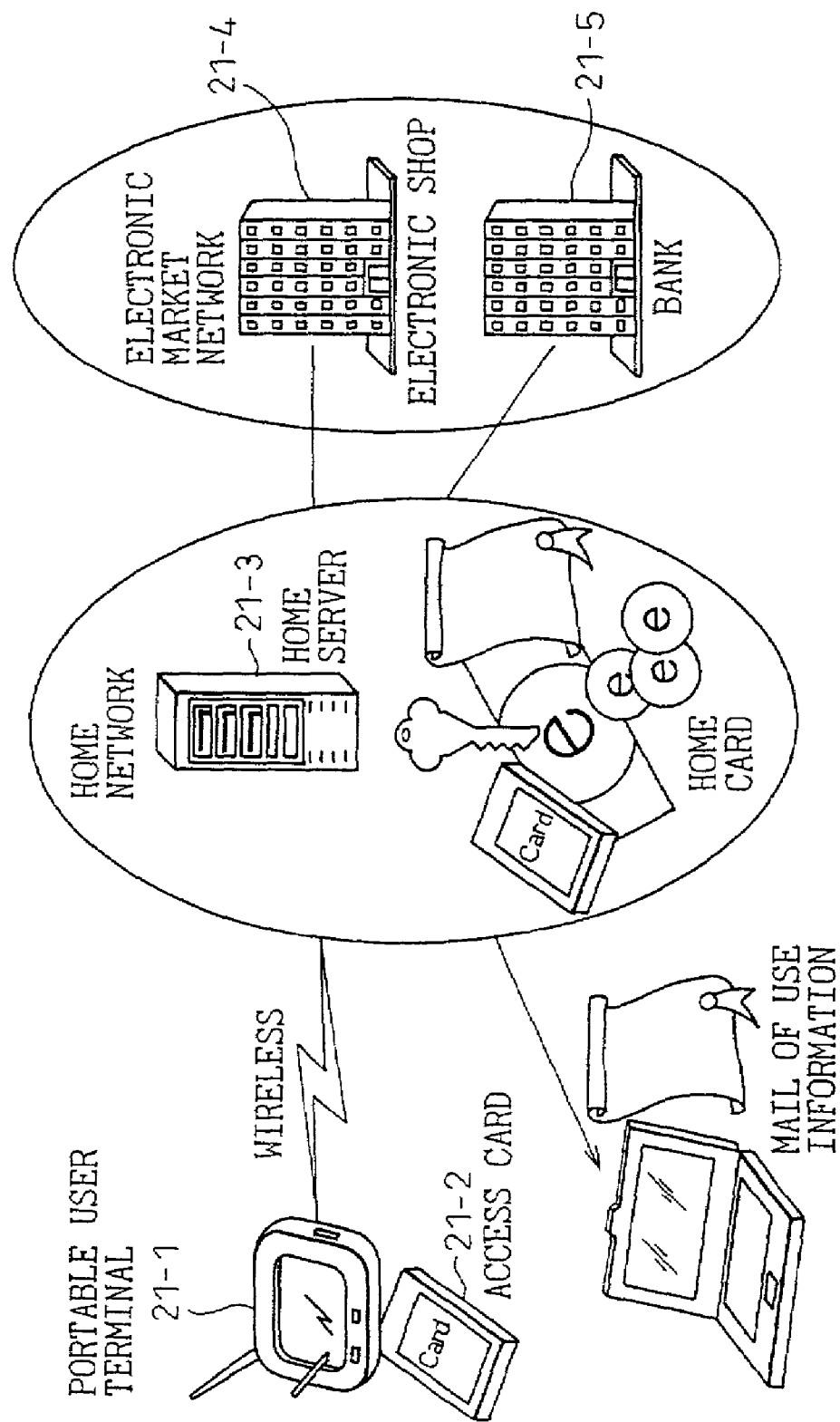
FIG. 21 shows utilized configuration in a wireless network according to the present invention.

FIG. 21 shows utilized configuration in a wireless network according to the present invention. Reference number 21-1 denotes a compact-type portable user terminal having low throughput for data processing and operation speed. First, the access card 21-2 is connected to the user terminal 21-1, and the user terminal 21-1 accesses a home server 21-3 in a home network through the wireless network. The home server 21-3 executes the proxy process for authentication and encryption so that it is possible to realize in safety the electronic commerce including the personal and secret information to an electronic shop 21-4 and a bank server 21-5 in an electronic market network. The user can execute, in safety, the electronic commerce whenever and wherever he pleases. Further, a result of the electronic commerce is informed to the mail address designated by the user.

Figure 22:
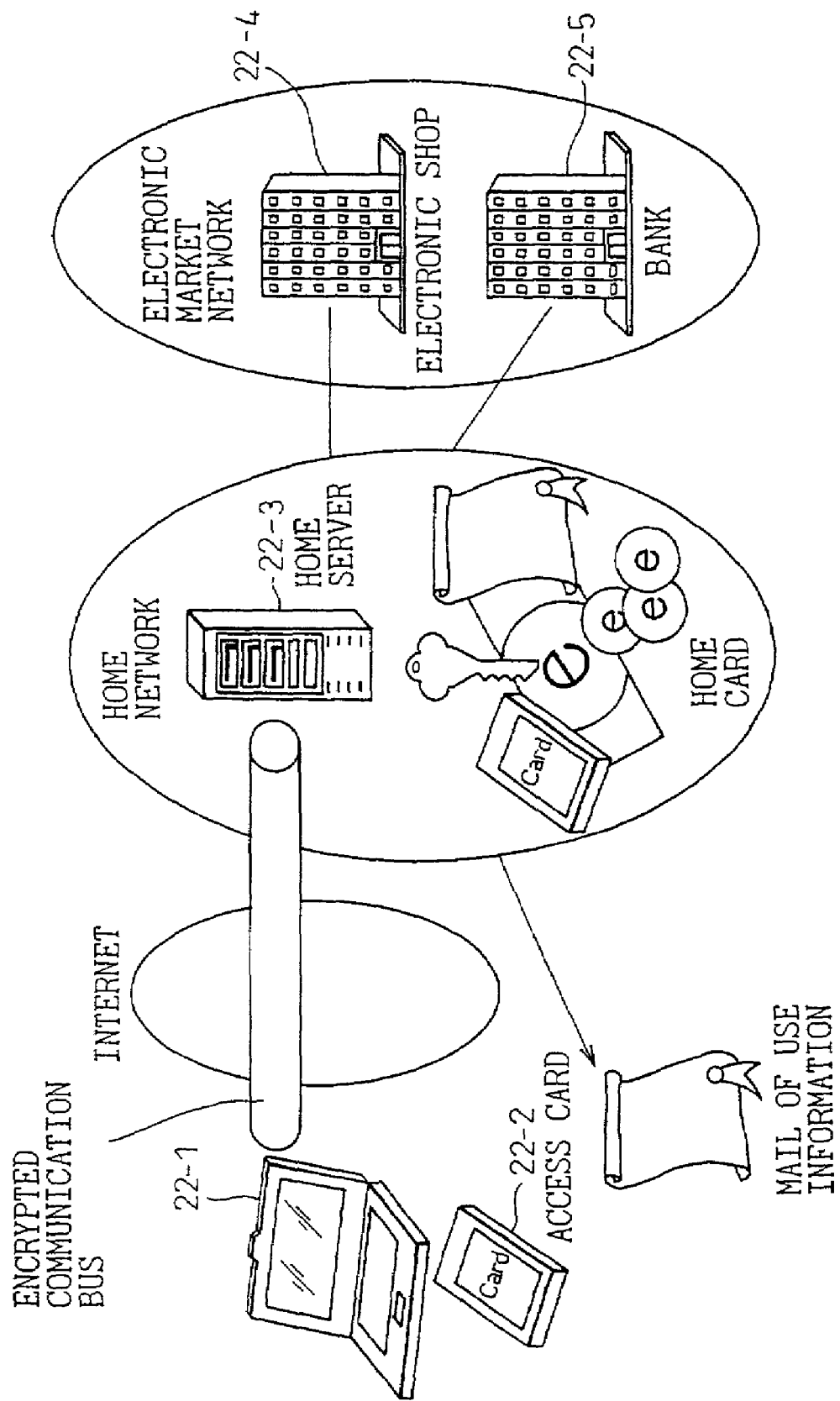
FIG. 22 shows utilized configuration in an office according to the present invention.

FIG. 22 shows a utilized configuration in an office according to the present invention. Reference number 22-1 denotes a computer, for example, a notebook computer, provided in the office and connectable to an Internet. First, an access card 22-2 is connected to the computer 22-1 so that it is possible to access the home server 22-3 in the home network. An encrypted communication path is established between the computer 22-1 and the home server 22-3 though the Internet. The home server 22-3 executes the proxy process for authentication and encryption so that it is possible to realize, in safety, the electronic commerce including the personal and secret information to the electronic shop 22-4 and the bank server 22-5 in the electronic market network.

Besides the electronic commerce, it is possible to realize, in safety, remote control of various home-electronic equipments connected to the home server 22-3, by transmitting and receiving encrypted information between the home server 22-3 and each home-electronic equipment.

Figure 23:
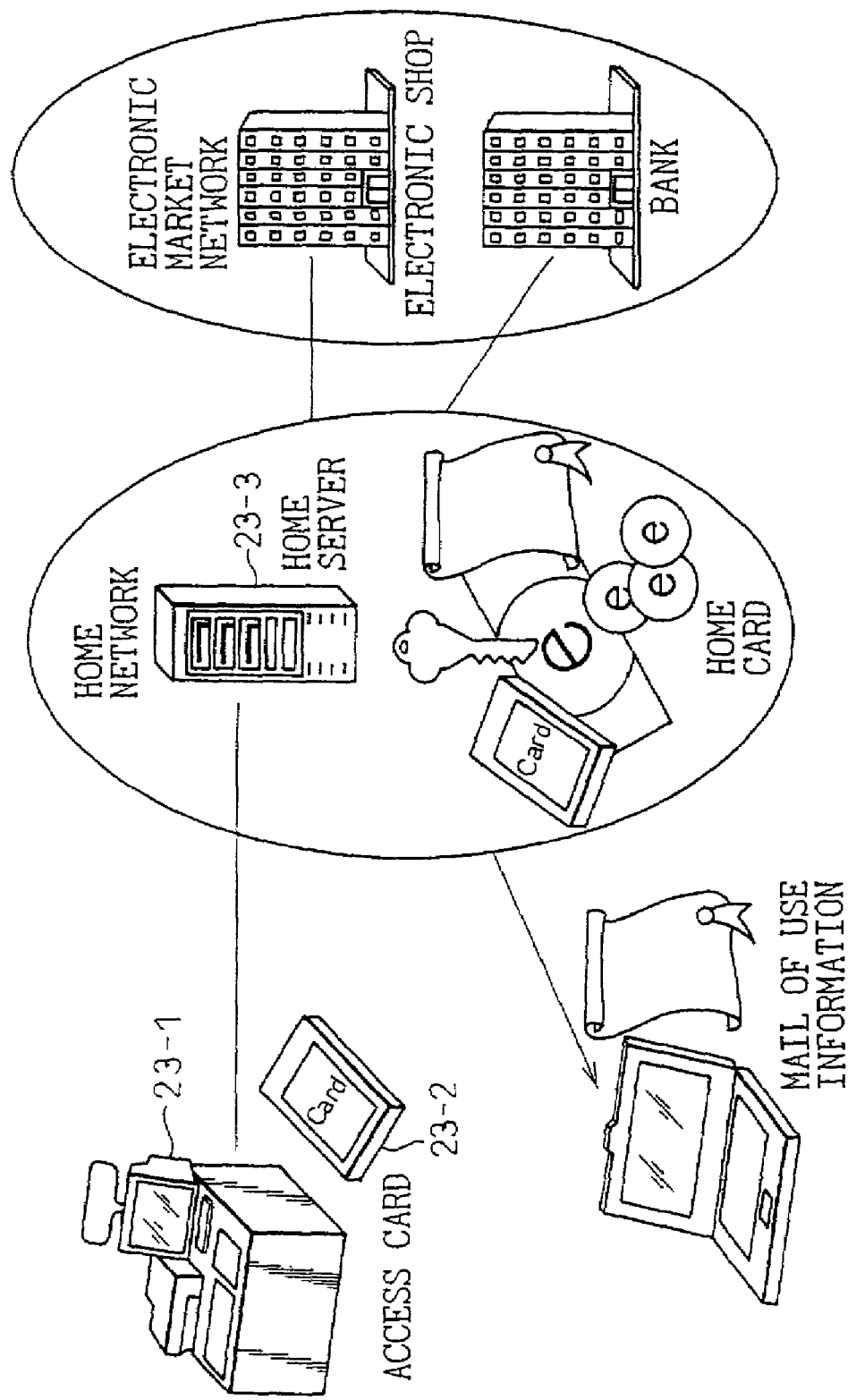
FIG. 23 shows utilized configuration in a convenience store according to the present invention.

FIG. 23 shows a utilized configuration in a convenience store according to the present invention. Reference number 23-1 denotes a data processing apparatus used as a POS (Point Of Sales) terminal or a cash register, provided in convenience stores or various shops. First, an access card 23-2 is inserted to the data processing apparatus 23-1 so that the user can access the home server 23-3 in the home network through the Internet. The home server 23-3 executes the proxy process for authentication and encryption so that it is possible to realize the electronic commerce and to utilize, in safety, electronic money.

In this case, even if the access card is lost or stolen accidentally, since the electronic money and the electronic certificate of the user are stored in the home card in the home server with high security, there is no unauthorized use of the electronic money and the electronic certificate, from the access card itself, by a third party.

Figure 24:
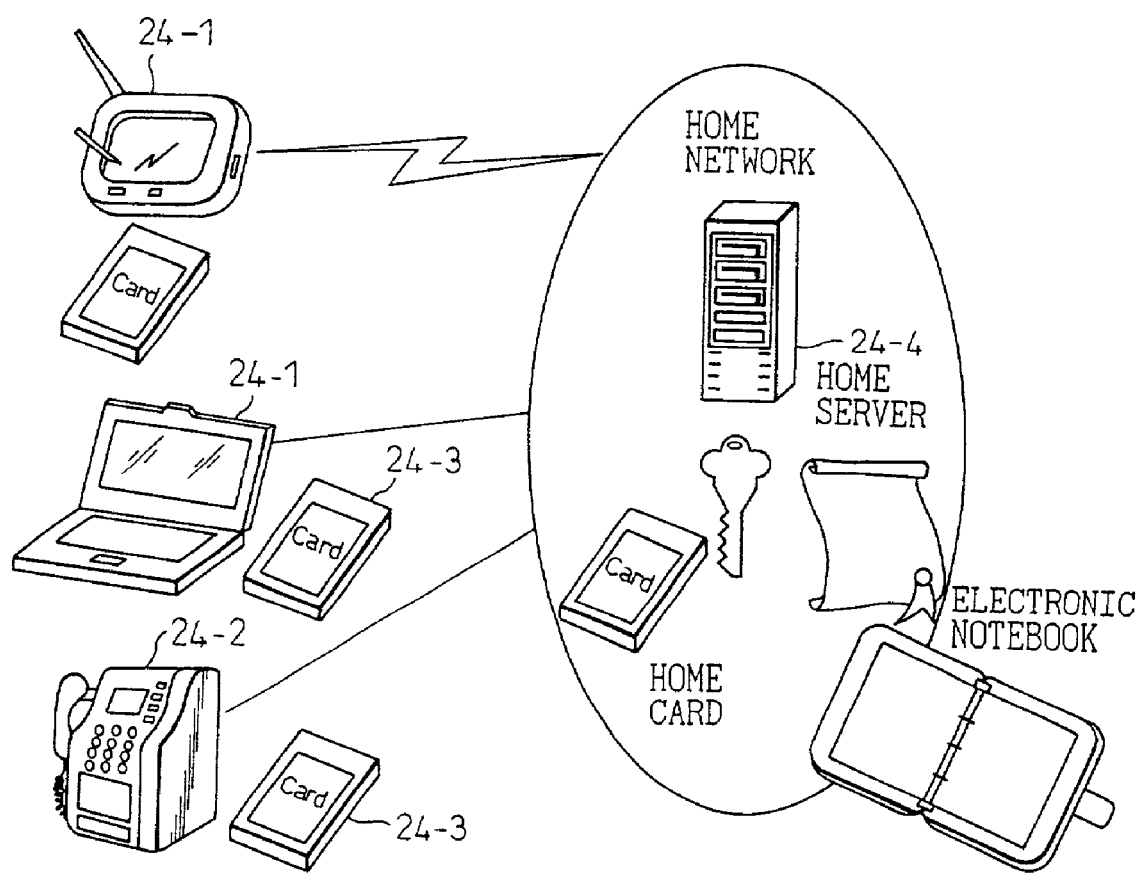
FIG. 24 shows utilized configuration in an information storage media according to the present invention.

FIG. 24 shows a utilized configuration in an information storage media according to the present invention. In this case, the home server 24-4 in the home network manages data of a PIM (personal information manager) used for, for example, an electronic notebook, so as to synchronize the data of the PIM between the user terminal 24-1 and the home server 24-4. As a result, it is possible to store in safety personal information, for example, schedule, address, work list, etc. in the home server 24-4. Accordingly, it is possible to utilize the home server 24-4 as storage that can be read and written in safety.

The invention claimed is:

1. A proxy server, provided between a user terminal and an electronic market server, including a proxy facility for executing authentication and encryption to the electronic market server, instead of the user terminal, in an electronic commercial transaction, comprising:

an establishing means for establishing an encrypted communication session between the user terminal and the proxy server, using public and secret keys of the user terminal and an electronic signature both transmitted from the user terminal;

a proxy means for executing authentication of a certificate and exchanging a common key X between the proxy server and the electronic market server, using public and secret keys of the electronic market server;

an informing means for informing the common key X to the user terminal through the encrypted communication session, which common key X is encrypted by using a common key X' that is exchanged between the user terminal and the proxy server; and a home card including an encryption managing means for executing the electronic signature and authentication of the certificate in order to execute authentication and exchange of the common key to the electronic market server, said home card cooperating with an access card connected to said user terminal to establish said encrypted communication session and to exchange said common key X', wherein the home card further includes a logic circuit which enables an access by using a first password input from the user terminal; and a security releasing means for releasing the security for the proxy means by using a second password input from the user terminal, after establishment of the encrypted communication session to the user terminal in which an access was permitted, whereby an encrypted communication is executed directly between the user terminal and the electronic market server by using the common key X that is exchanged between the proxy server and the electronic market server.

2. A proxy server including a proxy facility as claimed in claim 1, wherein the home card comprises an informing means for recording decision information regarding an electronic money in the home card and for informing the recorded decision information to a mail address of the user terminal.

3. A proxy server including a proxy facility as claimed in claim 2, wherein the home card comprises a cancel means for canceling the decision information in the home card based on an authentication information for canceling the decision, and for adding electronic money subtracted by the decision to the electronic money in the home card.

4. A proxy server including a proxy facility as claimed in claim 1, wherein the home card comprises a re-supplement means for supplementing the electronic money by adding supplementary electronic money, which was requested by the user terminal, to the electronic money in the home card, based on the authentication information in an electronic money managing facility provided in the proxy facility.

5. An access card used in an electronic commercial transaction constituted by a user terminal, a proxy server and an electronic market server; the access card being connected to the user terminal; and the proxy server including a proxy facility being provided between the user terminal and the electronic market server for executing authentication and encryption to the electronic market server, instead of the user terminal; the access card comprising:
  an establishment means for establishing an encrypted communication session between the user terminal and the proxy server including the proxy facility; and
  an encrypted communication means far receiving a common key X, which is exchanged between the proxy server and the electronic market server after an authentication process for the electronic market server and is encrypted by using a common key X' that is exchanged between the user terminal and the proxy server, from the proxy server trough the encrypted communication session, and for executing the encrypted communication with the electronic market server directly by using the common key X, wherein
  said proxy server comprises a home card including an encryption managing means for executing the electronic signature and authentication of the certificate in order to execute authentication and exchange of the common key to the electronic market server, said home card cooperating with the access card connected to said user terminal to establish said encrypted communication session and to exchange said common key X', wherein the home card further includes a logic circuit which enables an access by using a first password input from the user terminal; and a security releasing means for releasing the security for the proxy means by using a second password input from the user terminal, after establishment of the encrypted communication session to the user terminal in which an access was permitted.

6. A server being able to communicate with a user terminal and the opposing server having an authentication facility to authenticate the user terminal in accordance with predetermined procedures in an electronic commercial transaction to perform encrypted communication with the user terminal directly, comprising:
  a reception unit to receive an identification information and a request for executing an authentication process, from an access card connected to the user terminal;
  a decision means for determining whether or not the identification information is stored in an internal or external memory;
  a proxy means for executing a part, or all, communication in accordance with the predetermined procedures when the identification information is stored in the memory;
  an informing means for informing a common key X to the user terminal through the encrypted communication session, which common key X is encrypted by using a common key X' that is exchanged between the user terminal and the server; and
  a home card including an encryption managing means for executing the electronic signature and authentication of the certificate in order to execute authentication and exchange of the common key to the electronic market server, said home card cooperating with said access card to establish an encrypted communication session, to receive said request, and to exchange said common key X', wherein the home card further includes a logic circuit which enables an access by using a first password input from the user terminal; and a security releasing means for releasing the security for the proxy means by using a second password input from the user terminal, after establishment of the encrypted communication session to the user terminal in which an access was permitted.

7. A storage media storing a predetermined program used in a first server being able to communicate with a user terminal and a second server having an authentication facility to authenticate the user terminal in accordance with predetermined procedures in an electronic commercial transaction to perform encrypted communication with the user terminal directly, comprising:
  a first step of receiving an identification information and a request for executing an authentication process, from an access card connected to the user terminal;
  a second step of determining whether or not the identification information is stored in an internal or external memory;
  a third step of executing a part, or all, communication in accordance with the predetermined procedures when the identification information is stored in the memory; and
  a fourth step of informing a common key X to the user terminal through an encrypted communication session, which common key X is encrypted by using a common key X' that is exchanged between the user terminal and the first server, wherein
  said first server comprises a home card including an encryption managing means for executing the electronic signature and authentication of the certificate in order to execute authentication and exchange of the common key to the electronic market server, said home card cooperating with said access card to establish said encrypted communication session, to receive said request, and to exchange said common key X', wherein the home card further includes a logic circuit which enables an access by using a first password input from the user terminal; and a security releasing means for releasing the security for the proxy means by using a second password input from the user terminal, after establishment of the encrypted communication session to the user terminal in which an access was permitted.

8. A user terminal being able to communicate with a first server and a second server;
  wherein the first server includes a proxy facility for executing authentication with the second server instead of the user terminal, when receiving an identification information and a request for executing an authentication process from an access card connected to the user terminal; and the second server has an authentication facility to authenticate the user terminal in accordance with predetermined procedures and to provide a secret key X for an authorized destination as a result of authentication to perform encrypted communication with the user terminal directly;
  wherein the user terminal comprises a transmitting unit to transmit the identification information used for identifying its own terminal and the request for executing the authentication process, to the first server, and a receiving unit to receive the secret key X from the first server, which secret key X is encrypted by using a common key X' that is exchanged between the user terminal and the first server; and wherein said first server comprises a home card including an encryption managing means for executing the electronic signature and authentication of the certificate in order to execute authentication and exchange of the common key to the electronic market server, said home card cooperating with said access card to establish an encrypted communication session, receive said request, and exchange said common key X', wherein the home card further includes a logic circuit which enables an access by using a first password input from the user terminal; and a security releasing means for releasing the security for the proxy means by using a second password input from the user terminal, after establishment of the encrypted communication session to the user terminal in which an access was permitted.

* * * * *